(12) United States Patent
Karaul et al.

(10) Patent No.: US 7,085,260 B2
(45) Date of Patent: Aug. 1, 2006

(54) INTERNET PROTOCOL BASED WIRELESS CALL PROCESSING

(75) Inventors: Mehmet Karaul, Westfield, NJ (US); Thomas F. Laporta, Holmdel, NJ (US); Jonathan Lennox, New York, NY (US); Kazutaka Murakami, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 929 days.

(21) Appl. No.: 09/935,118

(22) Filed: Aug. 22, 2001

(65) Prior Publication Data

US 2002/0024943 A1 Feb. 28, 2002

Related U.S. Application Data

(60) Provisional application No. 60/281,127, filed on Apr. 2, 2001, provisional application No. 60/226,845, filed on Aug. 22, 2000.

(51) Int. Cl.
 *H04L 12/66* (2006.01)
(52) U.S. Cl. ...................................... 370/352; 370/349
(58) Field of Classification Search ................ 370/352, 370/353, 354, 355, 356, 328, 329, 335, 349
 See application file for complete search history.

(56) References Cited

U.S. PATENT DOCUMENTS

| | | | | |
|---|---|---|---|---|
| 6,167,040 A | * | 12/2000 | Haeggstrom | 370/352 |
| 6,424,637 B1 | * | 7/2002 | Pecen et al. | 370/328 |
| 6,650,905 B1 | * | 11/2003 | Toskala et al. | 455/522 |
| 6,888,803 B1 | * | 5/2005 | Gentry et al. | 370/259 |

* cited by examiner

*Primary Examiner*—Bob A. Phunkulh

(57) ABSTRACT

The invention provides a telecommunication system that allows communication between a circuit-based wireless telephony network and a packet-based Internet telephony network without requiring access to the Public Switched Telephone Network. The system includes a circuit-based wireless telephony network providing wireless access to the system, a packet-based Internet telephony network providing Internet telephony access to the system, and a base station gateway controller for providing an interface between the wireless telephony network and the Internet telephony network. The invention further provides methods for facilitating communication between a first device, the first device being a packet-based Internet telephony network based device, and a second device, the second device being a circuit-based wireless telephony network based device, by facilitating connection of a call from the first device to the second device, without requiring access to the public switched telephone network.

20 Claims, 30 Drawing Sheets

| ANALOGOUS ENTITIES IN SIP AND UMTS ||
| UMTS | SIP |
| --- | --- |
| HLR | REGISTRAR |
| GATEWAY MSC | HOME PROXY SERVER |
| SERVING MSC | END SYSTEM (FOR REGISTER) |
| MSISDN | USER ADDRESS (IN INVITE) |
| IMSI | USER ADDRESS (IN REGISTER) |
| MSRN | DEVICE ADDRESS |

| \multicolumn{3}{c}{MESSAGE WEIGHTS} | | |
| --- | --- | --- |
| SYMBOL | PARAMETER | VALUE |
| $w_{sip}$ | WEIGHT OF A SIP MESSAGE | 1.0 |
| $w_{isup}$ | WEIGHT OF AN ISUP MESSAGE | 1.0 |
| $w_{dns}$ | WEIGHT OF A DNS MESSAGE | 0.5 |
| $w_{map}$ | WEIGHT OF A MAP MESSAGE | 1.5 |

| \multicolumn{3}{c}{MOBILITY PARAMETERS} | | |
|---|---|---|
| SYMBOL | PARAMETER | VALUE |
| $r_{in}, r_{out}$ | RATE OF CALL DELIVERY / ORIGINATION | VARIABLE |
| $r_{bc}$ | AVERAGE BOUNDARY CROSSING RATE | VARIABLE |
| $P_t(t)$ | BOUNDARY CROSSING RATE PROB. DISTRIBUTION ($P(t_0 \geq t)$) | $e^{-r_{bc}t}$ |
| $s$ | CALL / MOBILITY RATIO | $\frac{r_{out}-r_{in}}{r_{bc}}$ |
| $P_{nr}$ | PROB. THAT DEVICE IS NEW TO A SERVING MSC | 50% |
| $P_{ur}$ | PROB. THAT DEVICE HAS A UNIQUE REGISTRAR AT ITS SERVING MSC | 20% |
| $P_{us}$ | PROB. THAT DEVICE HAS A UNIQUE SERVING MSC AT ITS HLR/REGISTRAR | 20% |

*FIG. 11*

| \multicolumn{3}{c}{PROTOCOL PARAMETERS} | | |
|---|---|---|
| SYMBOL | PARAMETER | VALUE |
| $t_{sip}$ | SIP REGISTRATION REFRESH INTERVAL | 3 hr |
| $t_{dns}$ | DNS CACHE TIME-TO-LIVE | 24 hr |
| $c_{auth}$ | NUMBER OF PIECES OF AUTHENTICATION DATA CACHED AT VLR | 5 |

*FIG. 12*

| CASE | FORMULA |
|---|---|
| MODIFIED REGISTRATION | |
| REGISTRATION | $r_{bc}((8+2/c_{auth})w_{map} + (2P_{nr}+4P_{ur})w_{dns} + 4(1+\sum_{i=1}^{\infty} P_t(it_{sip}))w_{sip})$ |
| CALL SETUP | $r_{in}(4P_{us}w_{dns} + 1w_{sip})$ |
| MODIFIED CALL SETUP | |
| REGISTRATION | $r_{bc}(8+2/c_{auth})w_{map}$ |
| CALL SETUP | $r_{in}(4w_{map} + 6P_{us}w_{dns} + 1w_{sip})$ |
| MODIFIED HLR | |
| REGISTRATION | $r_{bc}((8+2/c_{auth})w_{map} + 2P_{us}w_{dns})$ |
| CALL SETUP | $r_{in}(4P_{us}w_{dns} + 1w_{sip})$ |

*FIG. 13*

| CASE | FORMULA |
|---|---|
| MODIFIED REGISTRATION | |
| REGISTRATION | $r_{bc}(8+2/c_{auth})w_{map}$ |
| CALL SETUP | $r_{in}(4w_{map} + 1w_{sip} + 2w_{isup})$ |
| MODIFIED CALL SETUP | |
| REGISTRATION | $r_{bc}(8+2/c_{auth})w_{map}$ |
| CALL SETUP | $r_{in}(4w_{map} + 6P_{us}w_{dns} + 1w_{sip} + 1w_{isup})$ |
| MODIFIED HLR | |
| REGISTRATION | $r_{bc}((8+2/c_{auth})w_{map} + 2P_{us}w_{dns})$ |
| CALL SETUP | $r_{in}(2w_{map} + 4P_{us}w_{dns} + 1w_{sip} + 1w_{isup})$ |

*FIG. 22*

| 302 | INDEPENDENT PARAMETERS | |
|---|---|---|
| | DESCRIPTION | VALUE |
| $P$ | NUMBER OF PROCESSORS (SYSTEM SIZE) | 4 |
| $N$ | AVERAGE NUMBER OF REGISTERED USERS | [80K,400K] |
| $l_c$ | CALL ARRIVAL RATE (POISSON) | (0.3,5.5) |
| $r_c$ | RACTIO OF MO CALLS WITHIN $l_c$ | 2/3 |
| $u$ | CALL HOLDING TIME (EXPONENTIAL) | 90 secs |
| $l_r$ | MOBILE REGISTRATION RATE (NEAR-POISSON) | [0.1,2.0] |
| $r_r$ | INTER-MSC REGISTRATION RATIO WITHIN $l_r$ | 1/7 |

*FIG. 30*

| 312 | DERIVED PARAMETERS | |
|---|---|---|
| | DESCRIPTION | VALUE |
| $l_c \cdot r_c$ | MO CALL ARRIVAL RATE (POISSON) | (0.2,3.65) |
| $l_c \cdot (1-r_c)$ | MT CALL ARRIVAL RATE (POISSON) | (0.1,1.82) |
| $l_r \cdot r_r$ | BOUNDARY CROSSING RATE | [0.014,0.29] |
| $t$ | CALL SETUP LATENCY | MEASURED |

*FIG. 31*

STRUCTURE OF EMCP CALL PROCESSING ENGINE

INTERNET PROTOCOL BASED WIRELESS CALL PROCESSING

CROSS-REFERENCES TO RELATED APPLICATIONS

This application claims priority to U.S. provisional Application No. 60/226,845, filed Aug. 22, 2000, entitled, "WIRELESS INTERNET PROTOCOL BASED CALL PROCESSING EQUIPMENT," which is hereby incorporated herein by reference in its entirety, and to U.S. provisional Application No. 60/281,127, filed Apr. 2, 2001, entitled, "WIRELESS INTERNET PROTOCOL BASED CALL PROCESSING EQUIPMENT," which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to cellular wireless communications, and, more particularly, to systems and methods for interworking Internet telephony and wireless telecommunications networks, and for signaling and transport therein.

BACKGROUND OF THE INVENTION

A. Efforts to Interwork Internet Telephony and Wireless Telephony Systems

Two of the fastest growing areas of telecommunications are wireless mobile telephony and Internet telephony. Second and third-generation digital systems such as the Global System for Mobile communications (GSM), the Universal Mobile Telecommunications System (UMTS), and wideband CDMA are bringing new levels of performance and capabilities to mobile communications. Meanwhile, both the Internet Engineering Task Force's Session Initiation Protocol (SIP) and the International Telecommunications Union's H.323 enable voice and multimedia telephone calls to be transported over an Internet Protocol (IP) network. Subscribers to each of these networks need to be able to contact subscribers on the other. There is, therefore, a need to interconnect the two networks, allowing calls to be placed between them.

Some research has been performed investigating various aspects of interworking mobile communication systems with IP-based systems. The iGSM system allows an H.323 terminal to appear to the GSM network as a standard GSM terminal, so that a GSM subscriber can have his or her calls temporarily delivered to an H.323 terminal rather than a mobile device. Systems have been described for interworking GSM's in-call handover procedures with H.323. However, neither of these approaches solves the general interworking question: what is the best way for calls to be delivered and routed between the two networks?

As both mobile and Internet telephony are already designed to interconnect with the Public Switched Telephone Network (PSTN), the easiest way to interconnect them would be simply to use the PSTN as an intermediate link. This is, however, inefficient and suboptimal, as compared to connecting the networks by interworking the protocols directly, for a number of reasons.

First of all, routing calls via the PSTN can result in inefficient establishment of voice circuits. This is a common problem in circuit-switched wireless systems called "triangular routing," as illustrated in FIG. 1. Because a caller's local switch 10 does not have sufficient information to determine a mobile's correct current location, the signaling must travel to an intermediate switch 12 which can locate the subscriber correctly.

This intermediate switch 12 can be far away from the caller 14 and the destination even if the two are located in a geographically close area. Since voice circuits are established at the same time as the call signaling message is routed, the voice traffic could be transported over a long, inefficient route. Note that there is an architectural difference here between the American mobile system based on ANSI 41 and the European systems based on GSM/UMTS MAP. In the American system, calls are always routed through a home mobile switching center, which is in a fixed location for each subscriber, so the voice traffic for all of the subscriber's calls travels through that switch. By contrast, GSM improves on this routing by sending calls through a gateway mobile switching center, which can be located close to the originating caller. However, there are some cases, such as international calls, where an originating PSTN switch does not have enough information to conclude that a call is destined for the GSM/UMTS network, and thus routes it to the subscriber's home country. Because there is no way for circuit paths to be changed once they have been established, the call's voice traffic travels first to the user's home country and only then to his or her current location.

In Internet telephony, by contrast, the path of a call's media (its voice traffic, or other multimedia formats) is independent of the signaling path. Therefore, even if signaling takes a triangular route, the media travels directly between the devices which send and receive it. Since each device knows the other's Internet address, the packets making up this media stream are sent by the most efficient routes that the Internet routing protocols determine.

As we interwork Internet telephony with mobile telephony, we would like to maintain this advantage. We can accomplish this by supporting a direct IP connection between mobile base stations and IP terminals. With PSTN signaling, this is not possible, so IP telephony signaling must be used to establish this connection.

Another motivation for direct connection between mobile and Internet telephony is to eliminate unnecessary media transcoding. The Real-Time Transport Protocol (RTP), the media transport protocol common to both H.323 and SIP, can transport almost any publicly-defined media encoding. Most notably, the GSM 06.10 encoding is implemented by many clients. If a GSM mobile device talks to an RTP-capable Internet telephone with an intermediate PSTN leg, the media channel would have to be converted from GSM 06.10 over the air, to uncompressed (μ-law or a-law) audio over a PSTN trunk, and then again (likely) to some compressed format over the RTP media channel. The degradation of sound quality from multiple codecs in tandem is well known, and multiple conversions induce unnecessary computation. A direct media channel between a base station and an IP endpoint allows, by contrast, communication directly using the GSM 06.10 encoding without any intermediate transcodings.

Finally, on a broader scale, an integrated architecture supporting Internet and mobile telephony will evolve naturally with the expected telecommunications architectures of the future. Third-generation wireless protocols will support wireless Internet access from mobile devices. New architectures such as Router for Integrated Mobile Access (RIMA) for Mobile Switching Centers (MSCs) are using IP-based networks for communications between MSCs and base stations. In the fixed network, meanwhile, IP telephony is increasingly becoming the long-haul transport of choice even for calls that originate in the PSTN. The direct connection between Internet telephony and mobile networks takes advantage of all these changes in architecture and allows us to build on them for the future.

B. Signaling and Transport Between Internet Telephony and Wireless Telephony Systems The volume of traffic carried over packet networks, especially IP networks, has grown exponentially over the last decade. While this traffic has initially been generated by data applications, such as email and Web browsing, packet transport for voice and multimedia traffic is attractive to service providers because it will allow a single integrated network to be operated. There are many research and standards efforts underway to advance the use of IP technology for both voice transport and signaling for network control.

New packet networks supporting voice telephony must interwork with existing circuit switched networks for transport and signaling. For transport, media gateways are used to transform circuit interfaces to packet interfaces and vice versa. The interfaces to control these media gateways are being standardized in industry. For signaling, gateway controllers interwork call control protocols for Internet Telephony, such as H.323 and the SIP, with the PSTN protocols, such as the ISDN User Part (ISUP).

These changes have so far applied largely to the wired infrastructure, but are now spreading to the wireless networks as well. Currently deployed wireless networks, termed Second Generation (2G) networks, are using new packet air interfaces to support packet data applications. The next generation wireless networks, termed Third Generation (3G) networks, which are currently being standardized and trialed, will have higher speed packet air interfaces that support hundreds of Kbits/sec of traffic.

Service providers are interested in first using packet transport for voice inside the wired portion of their access networks to reduce operational costs, take advantage of statistical multiplexing, and move towards a single backbone network capable of supporting voice and data applications. As third generation networks are deployed, the packet voice interfaces may be extended all the way to the mobile terminal.

There currently exist several widely used air interface standards for 2G systems, including those based on Time Division Multiple Access (TDMA), such as GSM and IS-136, and Code Division Multiple Access (CDMA), such as IS-95. For 3G systems standards are converging around UMTS and DMA2000. Each of these air interfaces has a corresponding interface defined between the radio access network and the network access switching equipment.

Within the wired access network, all systems currently use circuit switched technology for transporting user/mobile information, and variants of ISUP for call control. Two standard protocols are widely deployed for mobility management: Mobile Application Part (MAP) for GSM systems and IS-41 for non-GSM systems.

FIG. 2 shows a simplified GSM/UMTS network 20. The mobile terminals or mobile stations (MS) 22 access the network 20 through a radio called the Base Terminal Station (BTS) 24. The BTS terminates the air interface with the mobile terminals. Multiple BTSs connect to a Base Station Controller (BSC) 26. The BSC 26 manages handoffs between BTSs 24 and provides a common interface to the MSC 28 called the A-interface. Current MSCs are circuit switches that are responsible for mobility management, call control, service access, and user traffic switching. Mobility management includes registering and authenticating mobile devices, directing handoffs between BSCs, and paging to locate mobile terminals.

The MSC 28 includes an internal database called the VLR 21 which is used to store profiles for the mobile terminals it is currently serving. The MSC 28 interacts with other switches to manage calls through an ISUP interface, and network databases using MAP. The network databases, which store permanent copies of user profiles and keep track of their current location, are called Home Location Registers (HLR) 23. Both ISUP and MAP are part of the Signaling System no. 7 (SS7), the family of signaling protocols used in the PSTN 25.

From the discussion above, it becomes clear that to add packet transport to a cellular network, wireless access switching equipment must support multiple interfaces for signaling and transport. In essence, the media and signaling gateways now being developed for wired packet-based telephony systems must also be built for wireless networks, and MSCs must control these gateways and support the various radio standards. One major challenge to a wireless telephony system is that they must be able to handle traffic mixes that vary at a much higher degree than those for their wired counterparts. The traffic mix may include call and mobility related Requests, Short Messaging Service (SMS), and supplementary services. The performance of a system will vary depending on this traffic mix overall and the ratio of calls and mobility, called call-to-mobility ratio, in particular. The call-to-mobility ratio for urban settings, for example, may differ significantly from that in rural settings. Other aspects that may affect the traffic pattern include differences in countries/regions of deployment and varying cost structures, among others.

Service providers seek wireless mobile systems that support IP telephony, handle various air interfaces, and can be deployed in various settings. While many of these issues are well understood and have been addressed individually, building a system that addresses them in an integrated fashion is extremely challenging.

SUMMARY OF THE INVENTION

In one embodiment, the invention provides a telecommunication system that allows communication between a circuit-based wireless telephony network and a packet-based Internet telephony network. The system includes a circuit-based wireless telephony network providing wireless access to the system, a packet-based Internet telephony network providing Internet telephony access to the system, and a base station gateway controller for providing an interface between the wireless telephony network and the Internet telephony network.

In another embodiment, the invention provides a method for facilitating communication between a first device, the first device being a packet-based Internet telephony network based device, and a second device, the second device being a circuit-based wireless telephony network based device, by facilitating connection of a call from the first device to the second device. The method includes: maintaining, at a mobile switching center, access to a first registration database containing location information to be utilized in locating the second device; receiving, by the mobile switching center, data representing the call from the first device; and, connecting the call from the first device to the second device via a packet-based Internet telephony network, utilizing the mobile switching center and the location information.

BRIEF DESCRIPTION OF THE DRAWINGS

The invention is illustrated in the FIGs. of the accompanying drawings which are meant to be exemplary and not limiting, in which like references are intended to refer to like or corresponding parts, and in which:

FIG. 11 is a table showing mobility parameters;

FIG. 12 is a table showing protocol parameters;

FIG. 13 is a table showing weighted packet counts for each approach;

FIG. 22 is a table showing weighted packet counts for each approach—non-IP-enabled visited network;

FIG. 30 is a table of independent parameters;

FIG. 31 is a table of derived parameters;

DETAILED DESCRIPTION OF THE PREFERRED EMBODIMENT

1 Overview

Figure 1:
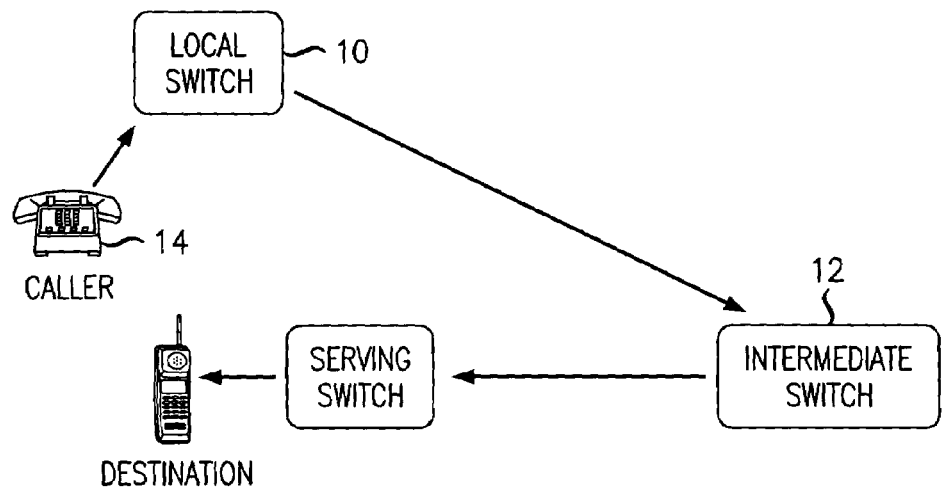
FIG. 1 is an illustration of triangular routing in mobile networks.
Figure 2:
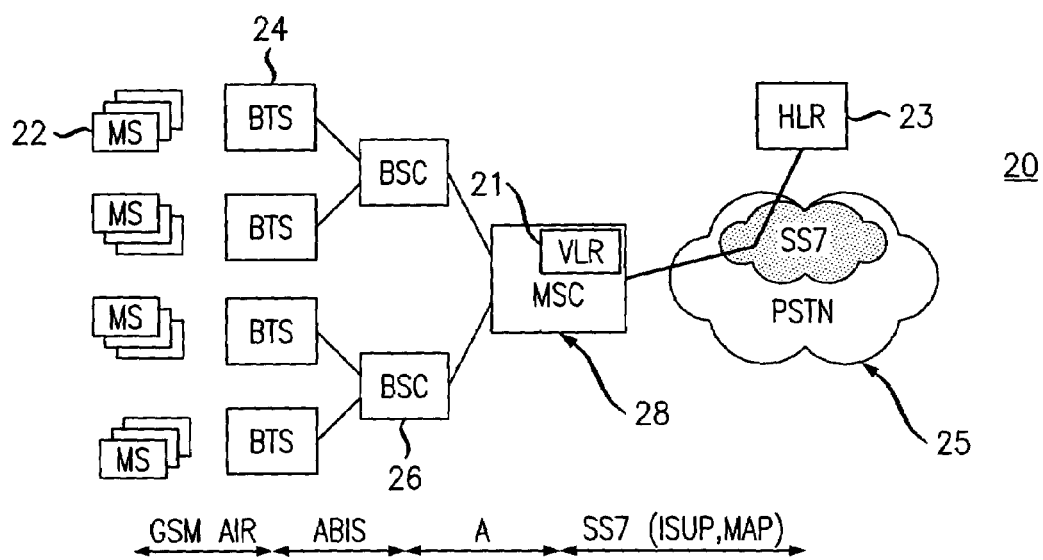
FIG. 2 shows a simplified GSM UMTS network.

One embodiment of the invention relates to the issue of how to interwork Internet telephony and mobile telecommunications, such that all the issues discussed above are resolved. For concreteness, we will illustrate our architecture using SIP for Internet telephony and UMTS Release 1999 for mobile telephony. UMTS Release 1999 is an evolution of the older GSM system. Newer UMTS releases are directly IP-based.

Section 2 gives an architectural background on the mobility and call delivery mechanisms of UMTS and SIP, to provide a basis for the following discussions. Section 3 describes three different approaches to interworking UMTS and SIP, under the assumption that UMTS visited networks are IP-enabled. Section 4 provides mathematical and numerical analyses of the three approaches. In Section 5, we describe and analyze how the efficiently the three approaches can interwork with existing non-IP-enabled infrastructure, and some concluding remarks are provided in Section 6.

In another embodiment of the invention, we describe a novel architecture for a packet-based MSC. To validate our ideas, we build our Enhanced Modular Call Processing (EMCP) system that serves as an MSC and evaluate its performance. Our system has two main components—a set of gateways for transforming between circuit formatted voice and packet voice, and a set of software modules for performing signaling and control functions. The software is modular so that it may easily support multiple signaling interfaces and procedures, and control multiple types of transport networks. The system described supports SIP and GSM interfaces; however, one skilled in the art can readily apply the teachings of the invention to support interface with other protocols, including, for example, UMTS.

Because the architecture of EMCP is modular and distributed, it has attractive scaling properties. It may scale from a very small system supporting only a few thousand users to a large system capable of supporting one million users by increasing the number of processors and gateway components. We exploit the dramatic improvement in the price performance of commodity processors and networking equipment so that these systems are cost efficient. Another advantage is that fault tolerance and recovery can be implemented much more cheaply via network redundancy rather than hardware redundancy. Finally, the MSC is able to handle a wide range of varying traffic patterns, making it suitable for deployment in various different settings. Our EMCP system inherits from our previous work on distributed call processing for mobile networks and shares their benefits such as system scalability, design flexibility, and functional extensibility, as described in: Thomas F. La Porta, Ramachandran Ramjee, Kazutaka Murakami, Richard W. Buskens, and Yow-Jian Lin, "Cluster mobile switching center for third generation wireless systems," in *The Ninth IEEE International Symposium on Personal, Indoor and Mobile Radio Communication (PIMRC)*, Boston, Mass., September 1998, which is hereby incorporated herein by reference in its entirety, as well as high availability, as described in: Kazutaka Murakami, Richard W. Buskens, Ramachandran Ramjee, Yow-Jian Lin, and Thomas F. La Porta, "Design, implementation, and analysis of a highly available distributed call processing system," in *The 28th International Symposium on Fault-Tolerant Computing (FTCS)*, Munich, Germany, June 1998, which is hereby incorporated herein by reference in its entirety, and in commonly assigned U.S. Pat. No. 6,192,250 to Buskens et al., issued on Sep. 1, 1998, which is hereby incorporated herein by reference in its entirety. EMCP extends the earlier work in numerous regards.

Contributions of this embodiment include: EMCP adopts packet access networks; it interfaces with packet data infrastructures to support packet voice terminals; it interfaces with IP telephony; transport and signaling are separated by controlling external media gateways; it supports multiple interfaces (e.g., GSM, SIP, SS7); EMCP implements new mechanisms to provide features such as call holding, call waiting, and three-way calling; a detailed performance evaluation yields new insights.

In Section 7, the network architecture and the call processing system are described in detail. Section 8 lays out one physical realization of this architecture, the GSM network. Sections 9 and 10 present some key performance FIGS. obtained through load testing and analysis. Section 11 describes implementation of one embodiment of the invention in which an Internet telephony system and a GSM wireless telephony system are interworked. Finally, Section 12 provides some concluding remarks.

2 UMTS and SIP Mobility and Call Delivery Mechanisms

In this section we review the mobility and call delivery mechanisms of UMTS and of SIP.

UMTS Mobility and Call Delivery

Figure 3:
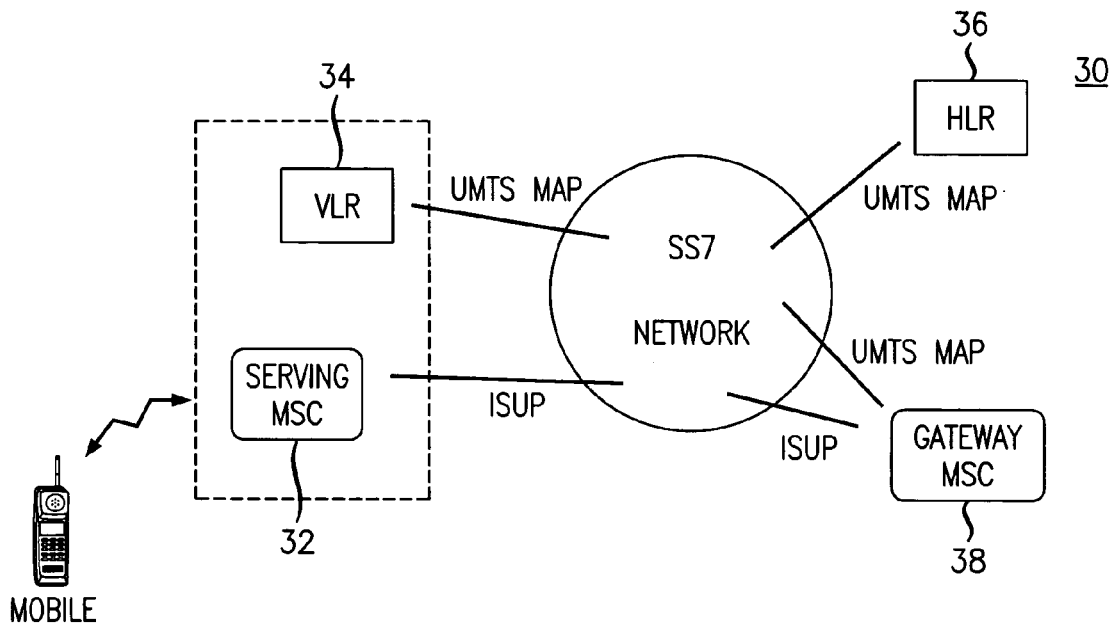
FIG. 3 shows elements of a GSM UMTS network, including a gateway MSC.

Some of the elements of a GSM/UMTS network (as shown, a UMTS network 30) are illustrated in FIG. 3. An MSC is a switching and control system in a wireless network. The MSC controlling the service area where a mobile is currently located is called its serving MSC 32. It routes calls to and from all the mobile devices within a certain serving area, and maintains call state for them. Associated with the serving MSC 32 is a VLR 34, a database which stores information about mobile devices in its serving area. (For the purposes herein we assume the predominant configuration in which the serving MSC 32 and VLR 34 are co-located.) Elsewhere in the fixed network we can find two other classes of entities. An HLR 36 maintains profile information about a subscriber and keeps track of his or her current location. A gateway MSC 38 directs calls from the PSTN into the mobile access network 30.

When a UMTS mobile device first powers up or enters the serving area of a new serving MSC, it transmits a unique identification code, its International Mobile Subscriber Identity (IMSI) to the MSC. From the IMSI, the serving MSC determines the mobile's HLR and informs this HLR of the mobile's current location using the UMTS Mobile Application Part (UMTS MAP) protocol. The HLR stores this information and responds with profile data for the subscriber.

When a call is placed to a mobile subscriber, the public telephone network determines from the telephone number, called the MSISDN number, that the call is destined for a mobile telephone. The call is then directed to an appropriate gateway MSC. Call delivery from the gateway MSC is performed in two phases. In the first phase, the gateway MSC obtains a temporary routing number called a Mobile Station Routing Number (MSRN) in order to route the call to the serving MSC. For this purpose, the gateway MSC first locates the subscriber's HLR based on the MSISDN and requests routing information from it using UMTS MAP. The HLR then contacts the VLR at the serving MSC. The VLR returns an MSRN that the HLR forwards to the gateway MSC. In the second phase, the gateway MSC routes the call to the serving MSC using the standard ISUP protocol of the PSTN.

The MSRN is a temporarily assigned number which is allocated at the time the HLR contacts the VLR; it is valid only until the associated call is set up, and it is then recycled. This dynamic allocation of an MSRN is required because ISUP messages can only be directed to standard telephone numbers, and the quantity of these that can be allocated to a given serving MSC is limited. This has some costs, however, in the time needed to set up a call, as the serving MSC must be contacted twice during call setup.

When a subscriber moves from one location to another while a call is in progress, two possible scenarios result: intra-MSC or inter-MSC handovers. An intra-MSC handover occurs when a subscriber moves between the serving areas of two base stations controlled by the same serving MSC. In this case, the serving MSC simply redirects the destination of the media traffic. No signaling is necessary over the PSTN or UMTS MAP. An inter-MSC handover, on the other hand, occurs when the subscriber moves from one serving MSC's area to another. The old serving MSC contacts the new one in order to extend the call's media circuit over the PSTN. The old serving MSC then acts as an "anchor" for both signaling and voice traffic for the duration of the call.

All of the globally-significant numbers used by the UMTS system—in particular, for the purposes herein, the MSRN, and the identifying number of the MSCs, in addition to the MSISDN—have the form of standard E.164 international telephone numbers. Therefore they can be used to route requests in Signaling System no. 7 (SS7), the telephone system's signaling transport network.

SIP Mobility and Call Delivery

Figure 4:
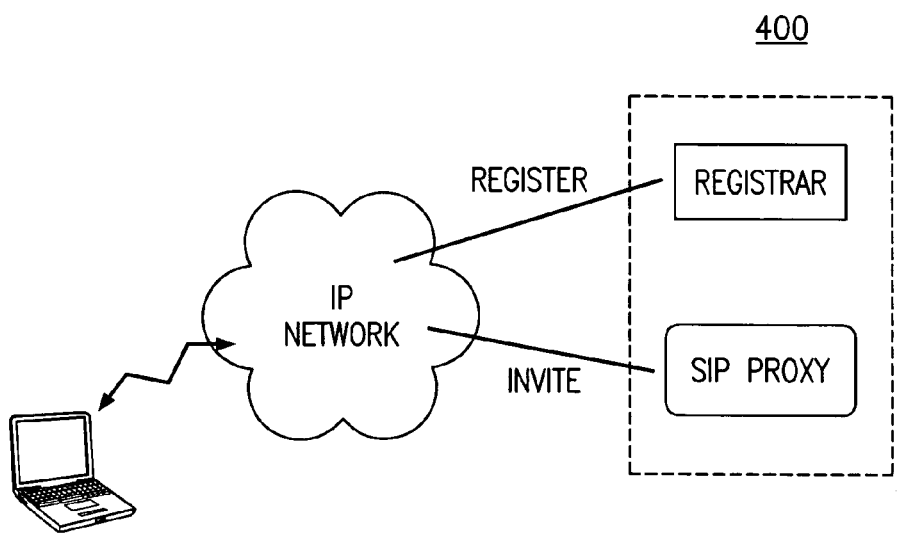
FIG. 4 shows elements of a SIP network.
Figures 5, 6:
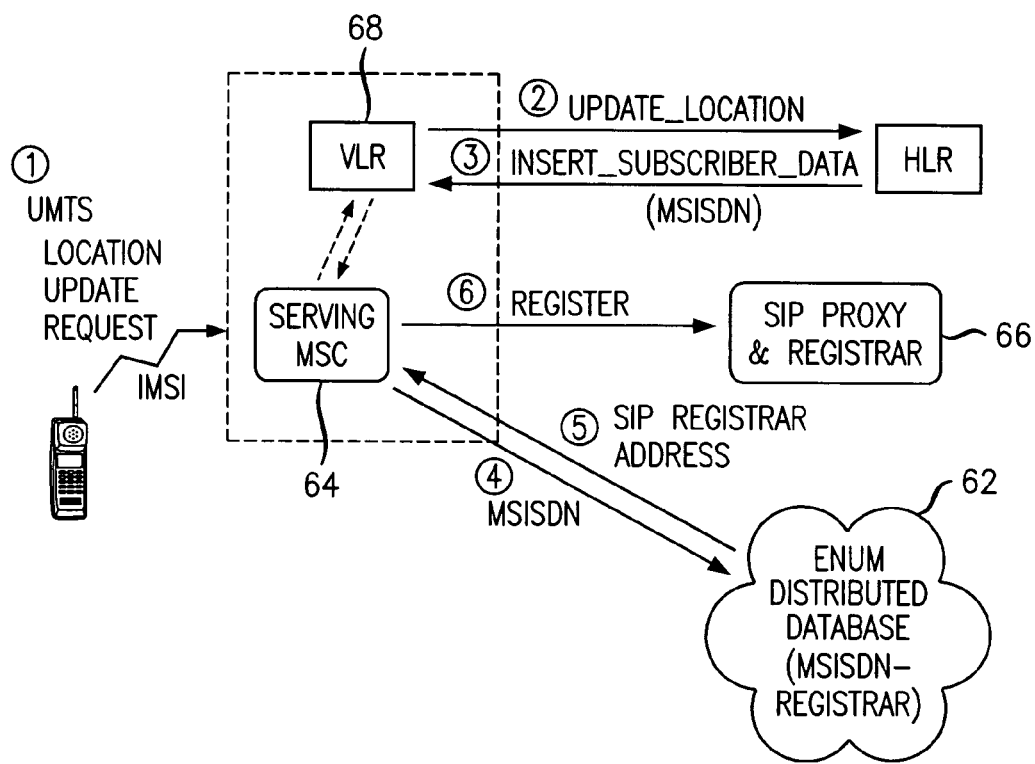
FIG. 5 is a table showings analogous entities in SIP and GSM/UMTS.
FIG. 6 shows a registration procedure for approach 1.

Architecturally, a pure SIP network 400 (illustrated in FIG. 4) is rather simpler than a UMTS network, as it is significantly more homogeneous and much of the work takes place at the network layer, not the application layer. All devices communicate using IP, and all signaling occurs with SIP. Although many of the specific details are different, mobility in a SIP environment is conceptually similar to that of UMTS. FIG. 5 lists some analogous entities in UMTS (or GSM) and SIP networks.

There are two significant architectural differences between mobility in SIP and UMTS. First of all, a SIP network does not have an intermediate device analogous to the serving MSC. Instead, end systems contact their registrars directly. Second, in SIP a two-phase process is not needed to contact the device during call establishment.

When a SIP subscriber becomes reachable at a new network address (either because she is using a new network device or because her device has obtained a new IP address through a mobility mechanism), the SIP device sends a SIP REGISTER to the user's registrar to inform it of the new contact location. This registration is then valid for only a limited period of time. Because end systems are assumed not to be totally reliable, registration information must be refreshed periodically (typically, once per hour) to ensure that a device has not disappeared before it could successfully de-register itself.

Unlike systems that use traditional telephone-network numbering plans, addresses in SIP are based on a "user@domain" format, similar to that of e-mail addresses. Any domain can, therefore, freely create an essentially unlimited number of addresses for itself. For the purposes of this discussion, it is useful to consider two types of addresses—"user addresses," analogous to an MSISDN number, to which external calls are placed, and "device addresses," roughly comparable to a non-transient MSRN. A device can create a temporary address for itself and have it persist for any period it wishes.

When a SIP call is placed to a subscriber's user address, a SIP INVITE message is directed to a proxy server is the domain serving this address. The proxy server consults the recipient's registrar and obtains his or her current device address. The proxy server then forwards the INVITE message directly to the device. Because the device address is not transient, the two-stage process used by UMTS is not necessary. Once the call is established, media flows directly between the endpoints of the call, independently of the path the signaling has taken.

Though not explicitly defined as part of the basic SIP specification, in-call handover mobility is also possible within SIP. A mechanism for an environment based entirely on SIP, with mobile devices which have an Internet presence, is described in Elin Wedlund and Henning Schulzrinne, "Mobility support using SIP," in *Second ACM/IEEE International Conference on Wireless and Mobile Multimedia* (*WoWMoM'99*), Seattle, Wash., August 1999. This mechanism does not use Mobile IP, as it suffers from a similar triangular routing issue as does circuit switching, and its handovers can be slow. Instead, it exploits SIP's in-call media renegotiation capabilities to alter the Internet address to which media is sent, once a device obtains a new visiting address through the standard mobile IP means. Therefore, Internet telephony calls can send their media streams to mobile devices' visiting addresses directly, rather than forcing them to be sent to the home addresses and then relayed by a home agent as in mobile IP.

3 Architecture

In this section we describe our systems for interworking SIP and UMTS networks. In our design UMTS mobile devices and their air interfaces and protocols are assumed to be unmodified. They use standard UMTS access signaling protocols and media encodings atop the standard underlying framing and radio protocols. Some UMTS entities within the fixed part of the network, however, are upgraded to have Internet presences in addition to their standard UMTS MAP and ISUP interfaces. Serving MSCs send and receive RTP packets and SIP signaling. In some of the approaches other UMTS fixed entities, such as HLRs, have Internet presences as well. These entities still communicate with each other using UMTS MAP and other SS7 signaling protocols, however. Note that it is possible that this SS7 signaling itself takes place over an IP network, using mechanisms such as the Stream Control Transmission Protocol (SCTP).

Section 5 will discuss compatibility with existing infrastructure, in the case where serving MSCs are not IP-enabled.

There are three primary issues to consider when addressing this interworking: how calls may be placed from SIP to UMTS, how they may be placed from UMTS to SIP, and how in-call mobility (handovers) are handled. The second and third of these points are relatively straightforward, and we will address them first. The first one is more challenging and represents an important focus herein.

SIP/UMTS Interworking: Calls from UMTS to SIP

Calls originating from a UMTS device and directed at a SIP subscriber are not, in principle, different from calls from the PSTN to a SIP subscriber. The primary issue when placing calls from a traditional telephone network to SIP is that traditional telephones can typically only dial telephone numbers, whereas SIP addresses are of a more general form, based roughly on e-mail addresses, which cannot be dialed on a key-pad. Work is ongoing to resolve this problem, but one currently envisioned solution is to use a distributed database based atop the domain name system, known as "Enum," which can take an E.164 international telephone address and return a SIP universal resource locator. For example, the E.164 number+1 732 332 6063 could be resolved to the SIP URI 'sip:lennox@bell-labs.com'.

Since globally significant UMTS numbers take the form of E.164 numbers, several of the approaches below use Enum-style globally distributed databases in order to locate Internet servers corresponding to these addresses. However, for such databases it would not be desirable to use the actual global Enum domain, as the semantics of the URIs returned is different.

SIP/UMTS Interworking: In-Call Handover

As explained earlier, there are two categories of in-call handover: intra-MSC and inter-MSC. Intra-MSC handover does not need to be treated specially for SIP-UMTS interworking. Because this happens between the serving MSC and the base stations, the network beyond the serving MSC is not affected. As an optimization, however, a serving MSC could use different IP addresses corresponding to different base stations under its control. In this case, a mechanism for SIP mobility as described before could be used to change the media endpoint address in mid-call. Inter-MSC handover does affect SIP-UMTS interworking, and remains for future study. We anticipate that existing mechanisms, as described earlier, could be adapted to SIP for this purpose.

SIP/UMTS Interworking: Mobile-Terminated Calls

The most complex point of SIP/UMTS interworking is the means by which a SIP call can be placed to a UMTS device. As discussed, it is desirable to set up media streams directly between the calling party and the serving MSC. In order to accomplish this, SIP signaling must travel all the way to the serving MSC, as only the serving MSC will know the necessary IP address, port assignment conventions, and media characteristics.

We present three methods as to how SIP devices can determine the current MSC at which a UMTS device is registered. These have various trade-offs in terms of complexity, amount of signaling traffic, and call setup delay.

Approach 1: Modified Registration

Our first approach is to enhance a serving MSC's registration behavior. The basic idea is that a serving MSC registers not only with the subscriber's HLR, but also with a "Home SIP Registrar." This registrar maintains mobile location information for SIP calls.

The principal complexity with this technique lies in how the serving MSC locates the SIP registrar. Our approach, illustrated in FIG. 6, is to use a variant 62 of the Enum database described above. Once the serving MSC 64 has performed a UMTS registration for a mobile device, it knows the mobile's MSISDN number. From this information, the Enum database 62 is consulted to determine the address of the device's home SIP registrar 66, and the serving MSC 64 performs a standard SIP registration on behalf of the device. A SIP call placed to the device then uses standard SIP procedures.

Because of authentication needs, this approach uses either eight or ten UMTS MAP messages (depending on whether authentication keys are still valid at the VLR 68) and six DNS messages per initial registration, and four SIP messages per initial or refreshed registration. Call setup requires a single SIP message and four DNS messages, though some DNS queries may be cached.

Note that only two of these six DNS messages are shown in FIG. 6. In addition, four DNS messages (two request/response pairs) are necessary to resolve the destination of a SIP request. The originator of the request must first perform an SRV query on the destination, which will return an A record giving an actual hostname. The returned hostname, or the original name if no SRV record was present for the host, must then be resolved with another query, to return the actual IP network address. (Some DNS servers may optimize these queries so that a response to an SRV query also contains response information to the corresponding A query, pre-empting it, but this is not always possible.) Thus, all the message counts in this section, and in Section 5, include four DNS messages for every SIP request sent, in addition to any DNS messages used for Enum queries.

However, these DNS queries can often be cached, so the computations of signaling load in Sections 4 and 5 adjust the weight due to DNS queries by a probabilistic factor of how likely it is that the query was cached. In cases where we can be certain the query will be cached—as for refreshed registrations—no DNS queries are listed, or included in the computations.

Compared to our other approaches, the above has two primary advantages. First, the only changes to the existing infrastructure are the modifications in the serving MSC and the addition of a variant Enum database to find registrars. Neither the SIP registrar and proxy server, nor the UMTS HLR and gateway MSC, need to be altered. Second, because the complexity of the approach occurs only in registration, call setup shares the single-lookup efficiency of SIP and is therefore relatively fast.

The disadvantages of this approach, however, also arise due to the separation of the two registration databases. First, once a system requires the maintenance of two separate databases with rather incomparable data, the possibility arises that the information in the databases becomes inconsistent due to errors or partial system failure. This is especially true because of the differing semantics of SIP and UMTS registrations—UMTS registrations persist until explicitly removed, whereas SIP registrations have a timeout period and must be refreshed by the registering entity. Furthermore, when mobility rates are low, the dual registration procedure imposes significantly more signaling overhead than UMTS registration alone, since SIP registrations must be refreshed frequently.

Approach 2: Modified Call Setup

Figure 7:
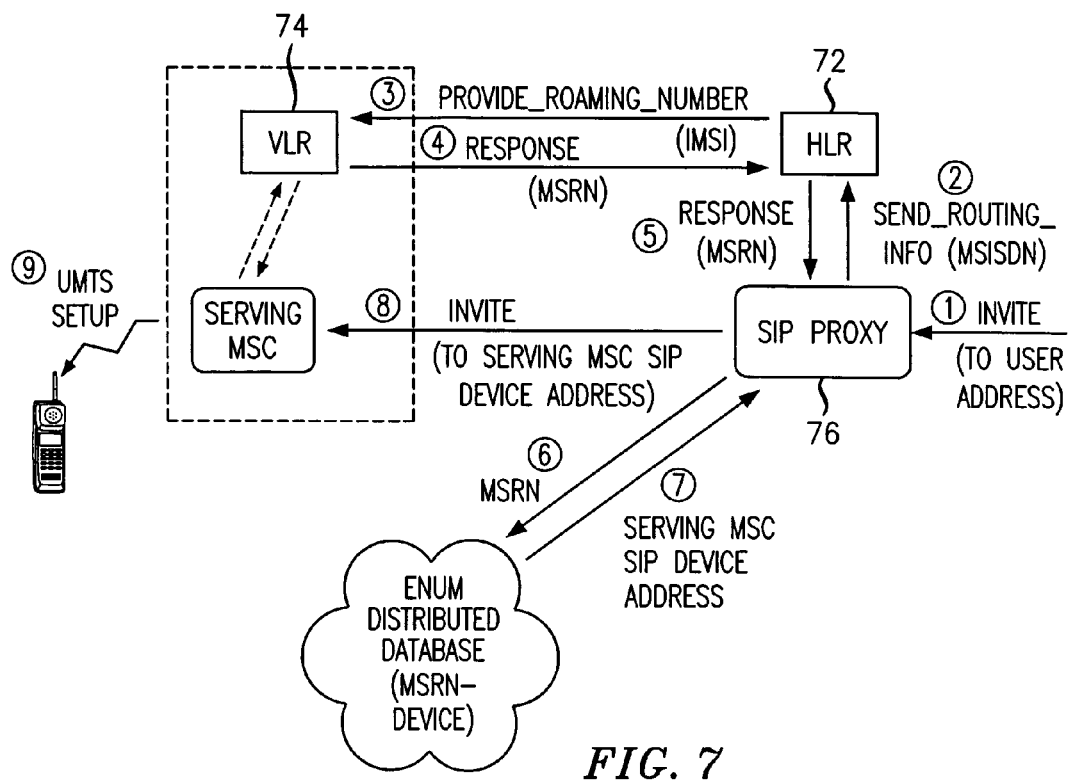
FIG. 7 shows a call setup procedure for approach 2.

By contrast, our second approach does not modify the UMTS registration procedure. Instead, it adds complexity to the call setup procedure. Essentially it adapts the UMTS call setup to SIP. This is illustrated in FIG. 7. When a SIP call is placed to a UMTS user, the user's home SIP proxy server 76 determines the MSISDN number corresponding to the SIP user address, and queries the UMTS HLR 72 for an MSRN. The HLR 72 obtains this through the normal UMTS procedure of requesting it from the serving MSC's VLR 74. The SIP proxy server 76 then performs an Enum lookup on this MSRN, and obtains a SIP address at the serving MSC to which the SIP INVITE message is then sent.

This approach uses either eight or ten MAP messages, as with standard UMTS, for registration, and four MAP messages, six DNS messages, and one SIP message for a call setup.

Because this approach does not modify the UMTS registration database, it has several advantages over the previous approach. Specifically, there is no possibility for data to become inconsistent, and the overhead of registration is as low as it is for standard UMTS. However, both the signaling load and the call setup delay are high, as call setup now involves a triple-phase query: a UMTS MAP query for the MSRN, an Enum lookup for the SIP device address, and finally the actual call initiation. Additionally, we have a new requirement that the SIP proxy server and the HLR need to be able to communicate with each other. This imposes additional complexity in both these devices, as it requires new protocols or interfaces.

Approach 3: Modified HLR

Our final approach is to modify the UMTS HLR. In this approach, the serving MSC registers the mobile at the HLR through standard UMTS means. The HLR then has the responsibility to determine the mobile's SIP device address at the serving MSC.

Figure 8:
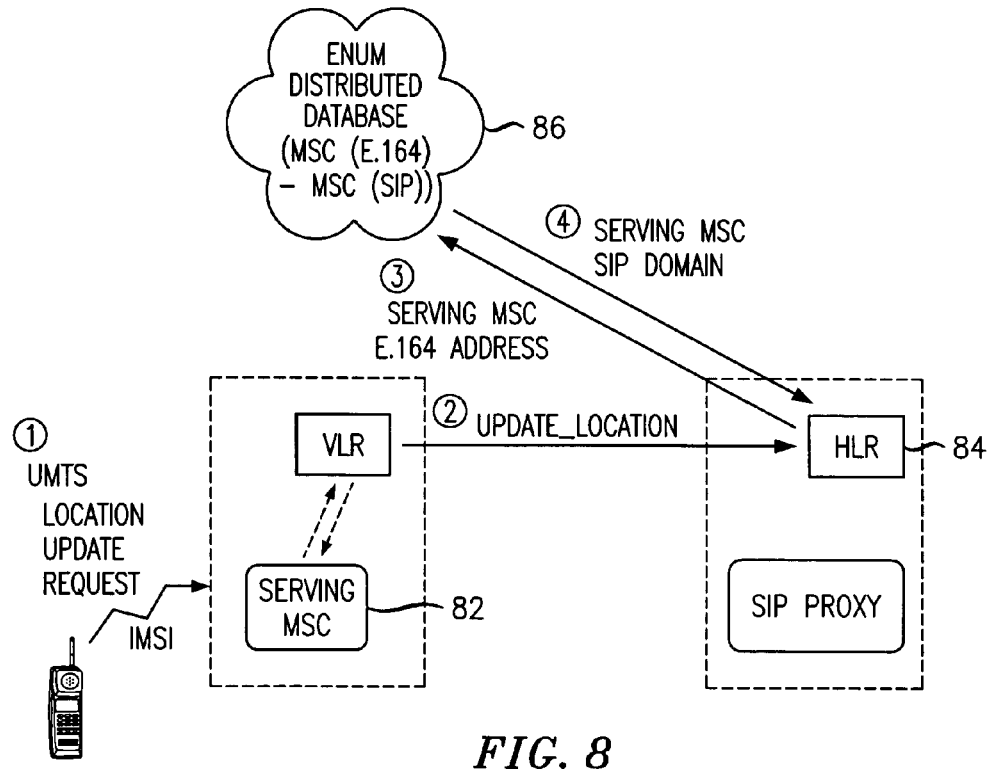
FIG. 8 shows a registration procedure for approach 3.

The overall registration procedure for this approach is illustrated in FIG. 8. When a serving MSC 82 communicates with an HLR 84, the HLR 84 is informed of the serving MSC's address, which, as mentioned earlier, is an E.164 number. The HLR 84 performs a query to a specialized Enum database 86 to obtain the name of the serving MSC's SIP domain, based on the serving MSC's address. While the previous two approaches treat the SIP device address as an opaque unit of information whose structure is known only to the serving MSC 82, this approach takes advantage of its structure.

Figures 9, 10:
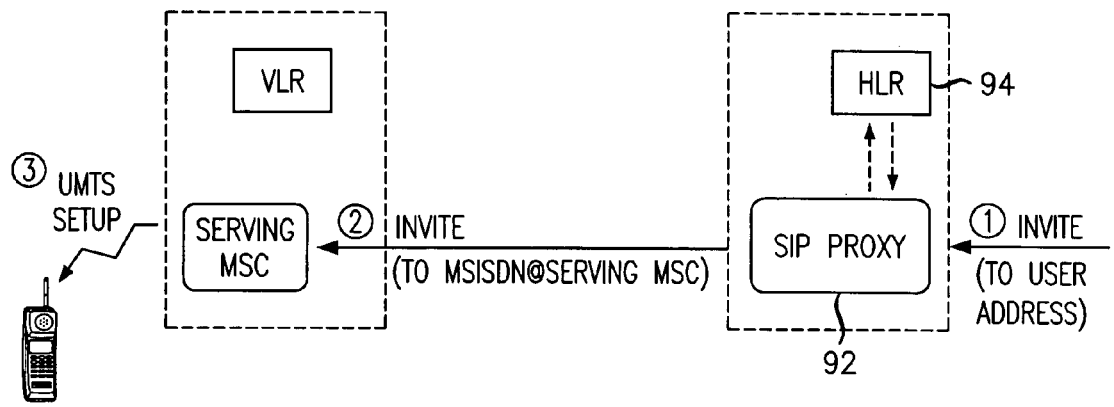
FIG. 9 shows a call setup procedure for approach 3.
FIG. 10 is a table showing message weights.

FIG. 9 shows how a SIP call is placed. The SIP proxy server 92 queries the HLR 94 for a SIP address and the HLR 94 returns an address of the form "MSISDN@hostname.of.serving.MSC" to which the SIP proxy server 92 then sends the call. This approach uses either eight or ten MAP messages, and two DNS messages, for registration, and four DNS messages and one SIP message for call setup. Because in this approach the HLR 94 and the SIP proxy server 92 are assumed to be co-located, the communication between them is local and therefore can be considered as "free."

This approach has the advantage that its overhead is relatively low for registration and quite low for call setup. The time requirements for call setup are similarly low. It does, however, require invasive modifications of HLRs. Additionally, the SIP proxy server and the HLR must be co-located, or else they must also have a protocol defined to interface them.

4 Analysis

Two important criteria for evaluating the signaling performance of these three approaches for interworking SIP and UMTS are signaling load and call setup delay. A detailed study of call setup delay remains for future investigation. Herein we focus on performance in terms of signaling load.

Each of the approaches involves the use of several different protocols, in varying ratios. In order to compare total signaling load imposed by each protocol, we assigned signaling messages of each protocol a weight. The default values of these weights are listed in FIG. 10. We discuss the effect of these weights on the total signaling load in our sensitivity analysis later in this section.

FIGS. 11 and 12 list the parameters for our model. We assume equal rates of call delivery $r_{in}$ and $r_{out}$, as is commonly observed in European settings. We assign an exponential distribution to the probability $P_t(t)$ that a mobile remains in a particular MSC's serving area for longer than time t. DNS caching was accounted for by assigning the probabilities $P_{nr}$, $P_{ur}$, and $P_{ns}$ to the likelihood that particular DNS queries have been performed recently, within the DNS time-to-live period.

FIG. 13 shows the equations for the weighted signaling loads for registration and call establishment in each approach. These equations are based on the packet counts for each approach in Section 3.

Figure 14:
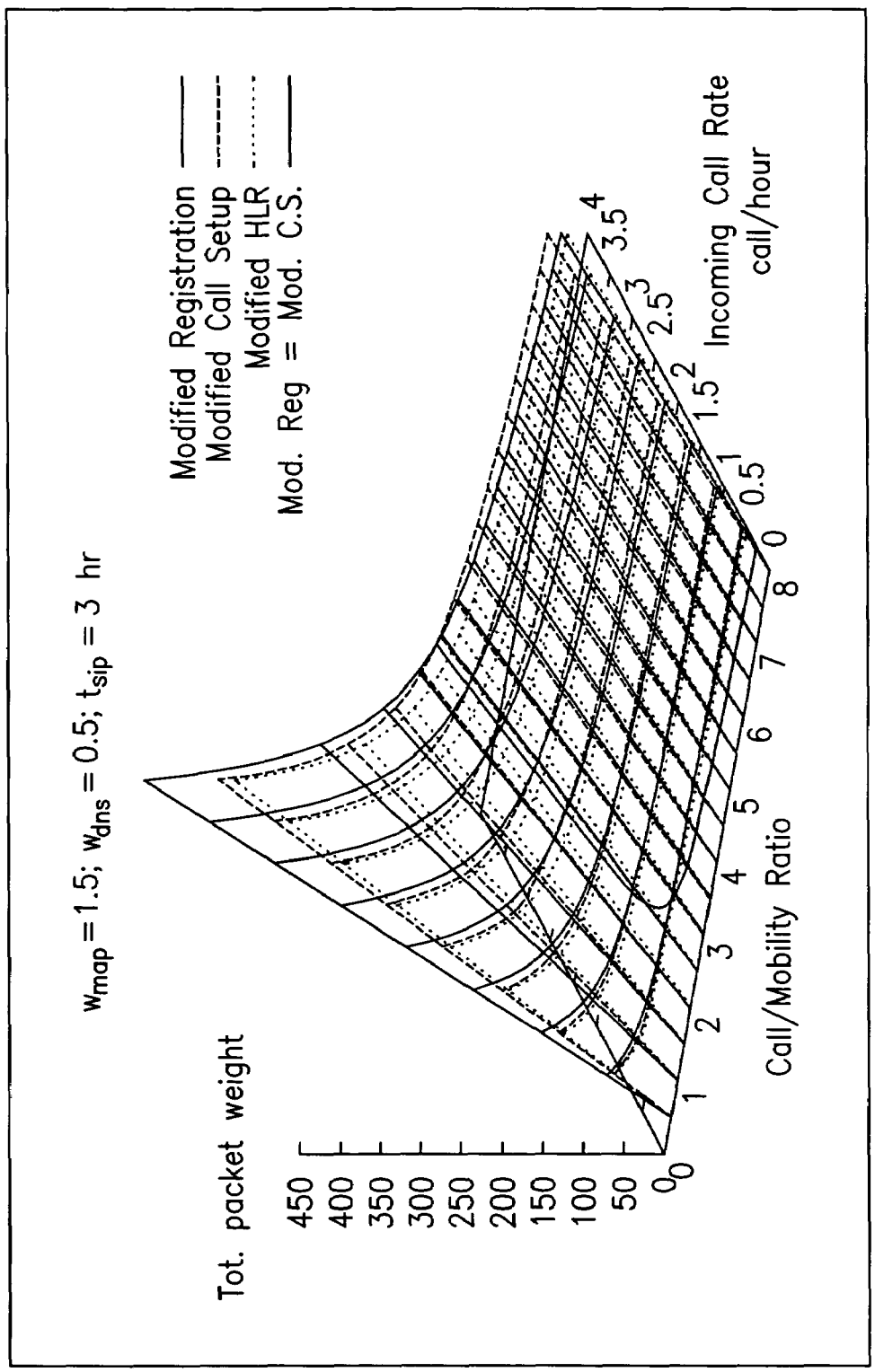
FIG. 14 is a graph showing a weighted signaling load of the three approaches.

FIG. 14 graphs the total weighted signaling load (registration plus call setup costs) for each of the three approaches, as both the incoming call rate and the call/mobility ratio vary. The intersection line at which modified registration and modified call setup are equal is shown in bold.

From this graph, we can observe some general characteristics of the approach's signaling load. First, the modified HLR approach consistently has the lowest signaling load of the three, typically 20–30% less than the others. This corresponds to intuition, as it combines the "best" aspects of each of the other two approaches, unifying both an efficient registration and an efficient call setup procedure.

Second, the relative signaling loads for the other two approaches depend on the values of the traffic parameters. Modified call setup is more efficient for a low incoming call rate or a low call/mobility ratio (i.e., fast mobility), while modified registration is more efficient when both parameters are high. A closer look at the equations in FIG. 13 reveals the reasons. Consider the relative efficiency of the two approaches for varying incoming call rates: modified call setup performs less well for high incoming call rates because its call setup procedure requires four additional UMTS MAP messages and possibly two additional DNS messages compared to that of modified registration. Similarly, modified call setup outperforms modified registration for low call/mobility ratios because the latter has higher registration message overhead due to dual registration and SIP registration soft-state.

In order to increase the confidence in the above results, we performed sensitivity analyses to validate our choice of various parameters.

Figure 15:
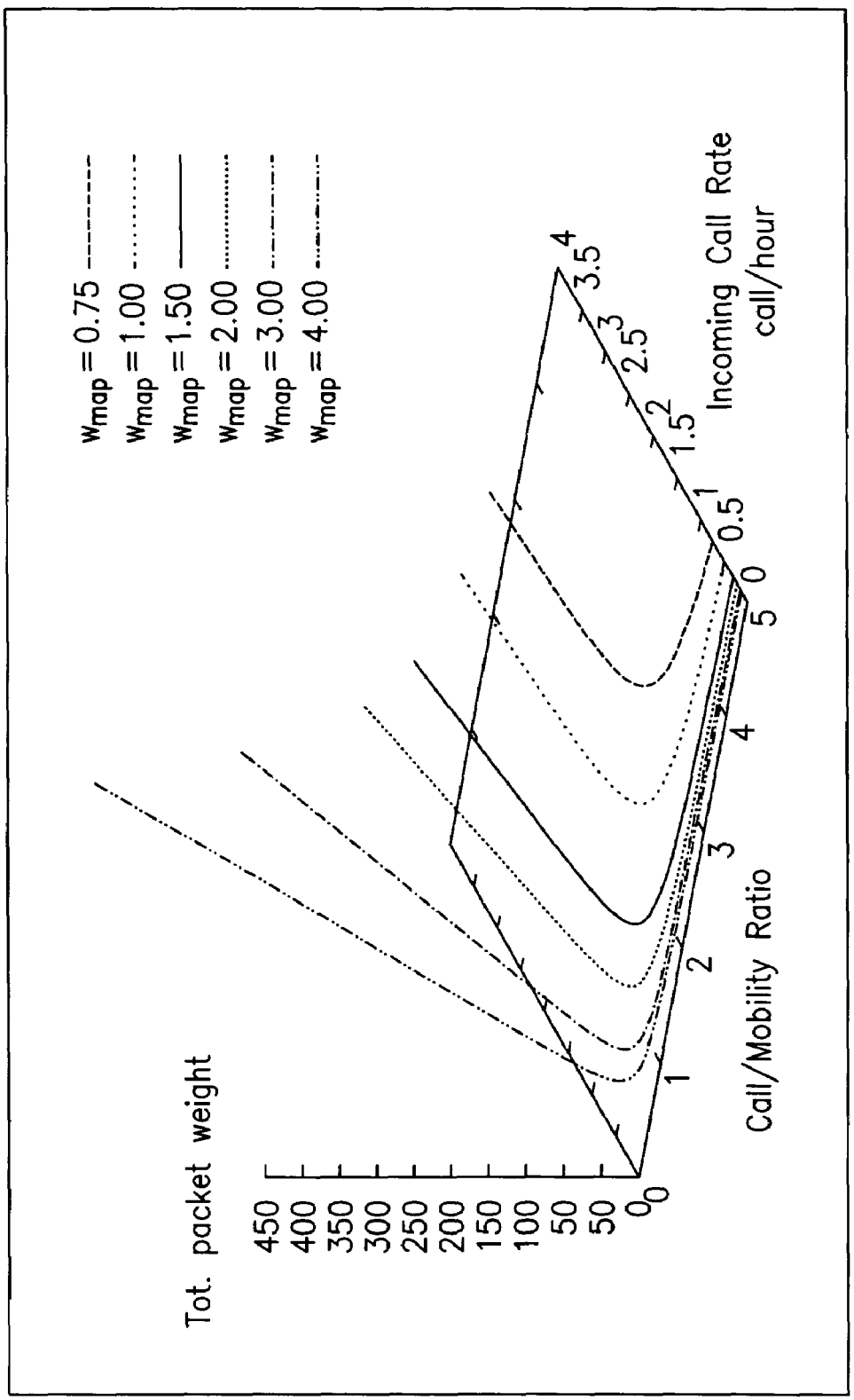
FIG. 15 is a graph showing a Line of Intersection: Mod. C.S.=Mod. Reg. ($\omega_{map}$ varying)
Figure 16:
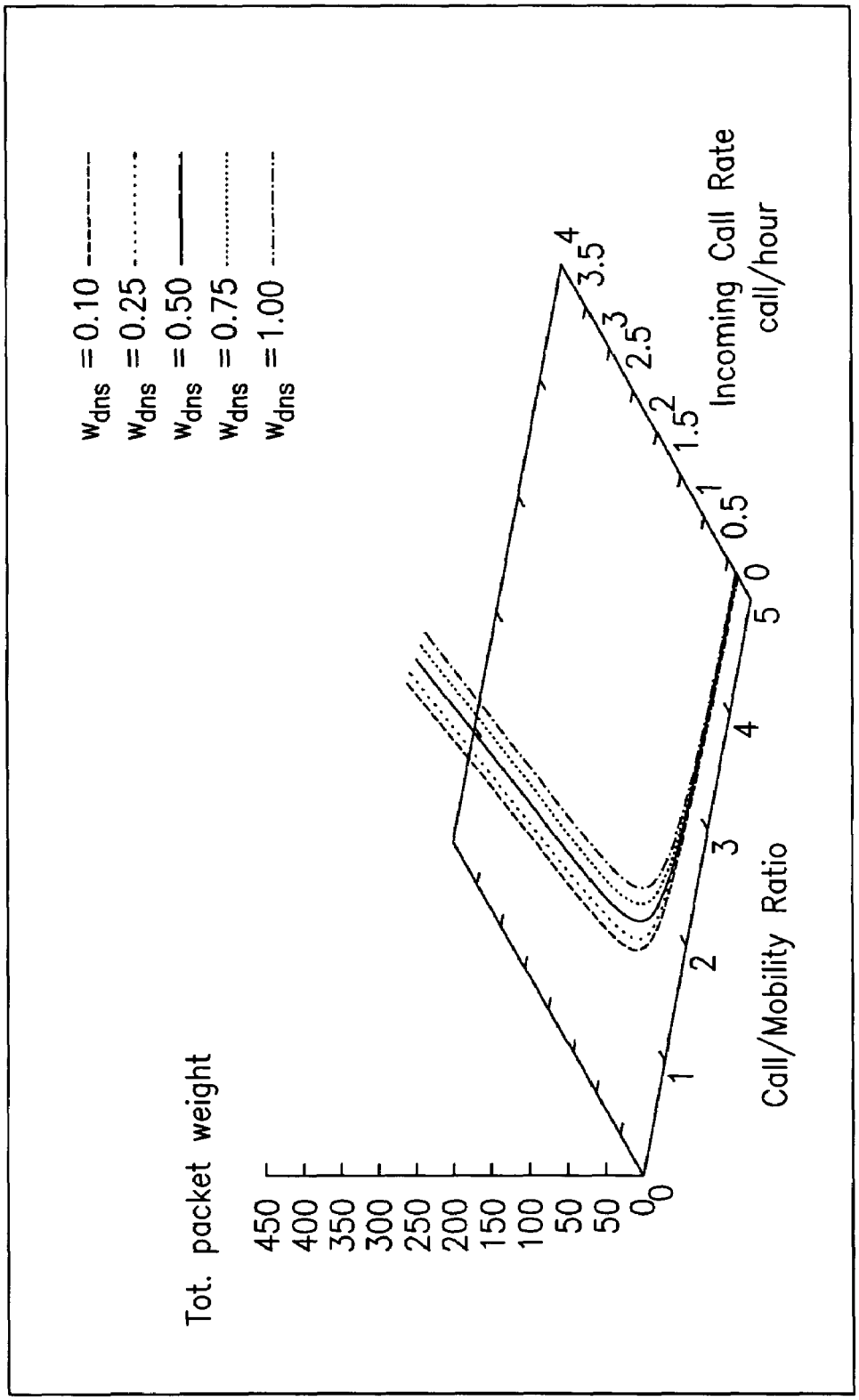
FIG. 16 is a graph showing a Line of Intersection: Mod. C.S. =Mod. Reg. ($\omega_{dns}$ varying)

Sensitivity analyses for the weights assigned to MAP and DNS messages are shown in FIGS. 15 and 16, respectively. These graphs illustrate how, as the protocol weighting changes, the position of the intersection line in FIG. 14 changes.

FIG. 15 shows that as the weight assigned to the MAP protocol increases, the area in which modified registration is more efficient—the right-hand side of the graph, where call rate and call/mobility ratio are both high—increases as well. This fits with the intuitive understanding of the approaches, as modified registration uses fewer MAP messages than modified call setup. Similarly, FIG. 16 shows that as the weight assigned to the DNS protocol increases, the area in which modified registration is more efficient shrinks slightly. This also fits with intuition, as modified registration uses more DNS packets. However, the total packet load is generally less sensitive to the weight assigned to DNS messages, which explains why the lines in FIG. 16 are relatively close to each other.

The signaling load of the modified HLR approach is always less than the other two. Thus, it is not shown in our sensitivity graphs. In regards to the other two protocols, though the crossover point moves as the weights assigned to the protocols vary, these sensitivity analyses show that the general shape of the graph, and therefore the conclusions we draw from it, do not change.

Figure 17:
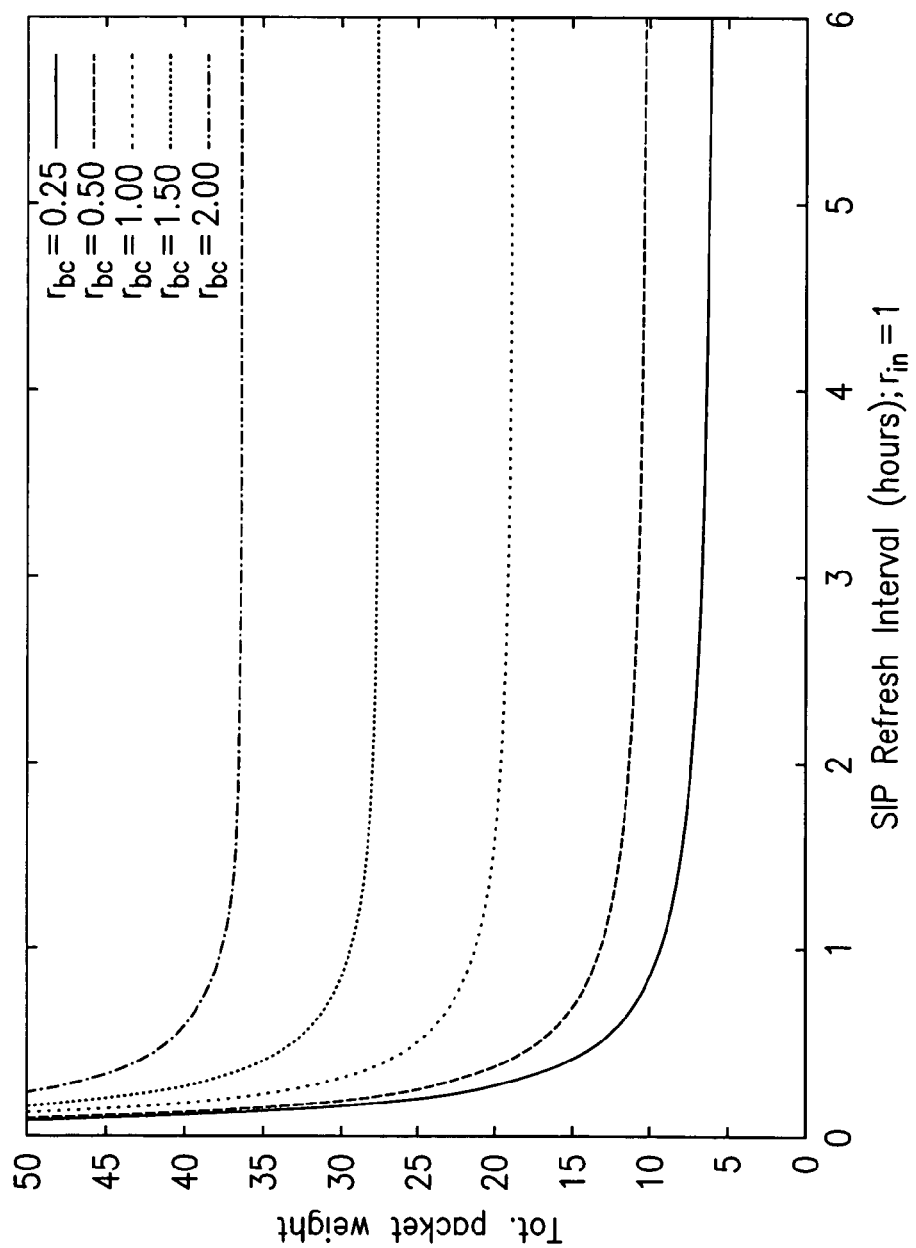
FIG. 17 is a graph showings total weight of modified registration.

FIG. 17 shows the effect of various choices of values for the SIP registration timeout period. (This value only affects the modified registration approach, as the other approaches do not use SIP registration.) The value for this parameter should be chosen so that the additional cost of SIP registration is relatively minor, that is, so that the graph has roughly flattened out. This optimal value therefore depends on the boundary crossing rate, but generally, a timeout of three hours is a good choice for most reasonable boundary crossing rates. This value can be larger than the standard value of one hour used by SIP, as serving MSCs can be assumed to be more reliable and available than regular SIP end systems.

5 Compatibility With Non-IP-Enabled Visited Networks

As we have demonstrated, using IP for wide-area communication to a serving MSC can be much more efficient than using the circuit-switched network. However, the existing deployed circuit-switched networks cannot be ignored, and any system for connecting voice over IP networks to mobile telephony networks will have to be able to connect to networks which have not been upgraded to the new protocols.

As discussed, both SIP and UMTS are designed to be able to interwork with the public switched telephone network. The entity which connects SIP to a circuit-switched network is called a SIP gateway. This gateway can terminates SIP and RTP connections from IP, and translate them into equivalent ISUP and circuit trunks on its circuit-switched side.

This same device can be used to interwork SIP and UMTS networks. Note that, in standard UMTS, a pure SIP/RTP—ISUP/Circuit gateway can be used. If UMTS with Route Optimization, or ANSI 41, is used instead, the gateway will also need to be able to understand some UMTS MAP or ANSI MAP messages for some supplementary services. Conceptually, this can be viewed as decomposing the SIP-enabled serving MSC into two devices: a traditional circuit-switched serving MSC, and a SIP-enabled gateway that communicates with it. Indeed, each of the schemes described above could be implemented in this manner. However, in the general case, we must assume that the user's visited network has no support for voice over IP networks at all. In this case, we must assume that the SIP system does not have the cooperation of the VLR and SMSC for registration, and no Enum database has records for the serving network's E.164 number space.

The Telephony Routing for IP (TRIP) protocol is used to locate an appropriate gateway from IP to the PSTN, based on a telephone number and on a provider's routing policy. Gateways can advertise routes to telephone numbers, with parameters indicating the "quality" of the route based on various criteria such as cost or geographic proximity. For SIP to UMTS routing, this means that we can locate a gateway close to a telephone number, minimizing the amount of triangular routing needed to reach that number. This route advertisement takes place off-line—the advertised data is stored in a local database in or near a device which needs to consume the data, and therefore these lookups are "free" in terms of the call setup message flows.

Interoperation Approaches for the Three Approaches

Each of the three approaches for SIP-to-UMTS calls in Section 3 can support interoperation with non-IP-enabled systems in a different way. In this section we review techniques for interoperation for each of the three approaches, and review their relative signaling performance.

Non-IP-enabled Visited Networks with Modified Registration

The first approach, modified registration, requires the serving MSC in the visited network to alter its registration procedure. The HLR and the SIP proxy server, in this case, are each unmodified.

In the interoperation case, however, we must assume the serving MSC is a standard UMTS device. In this case, therefore, the "modified registration" scenario does not actually involve a modified registration. Registration will simply be the standard UMTS registration procedure described in Section 2. We are left with no devices at all that have special knowledge of SIP and UMTS interworking, and so we must fall back to SIP-PSTN and PSTN-UMTS interworking.

In this scenario, when a SIP call is initiated, the SIP proxy discovers that the user is not at any SIP-enabled location. It does not know whether the user is at a non-SIP-enabled location, or is simply unreachable. To attempt to reach the user, it routes the call toward the user's MSISDN in the PSTN through an appropriate SIP gateway, and the PSTN then routes the call to a gateway MSC. The SIP gateway can either be discovered through TRIP, or pre-configured.

Figure 18:
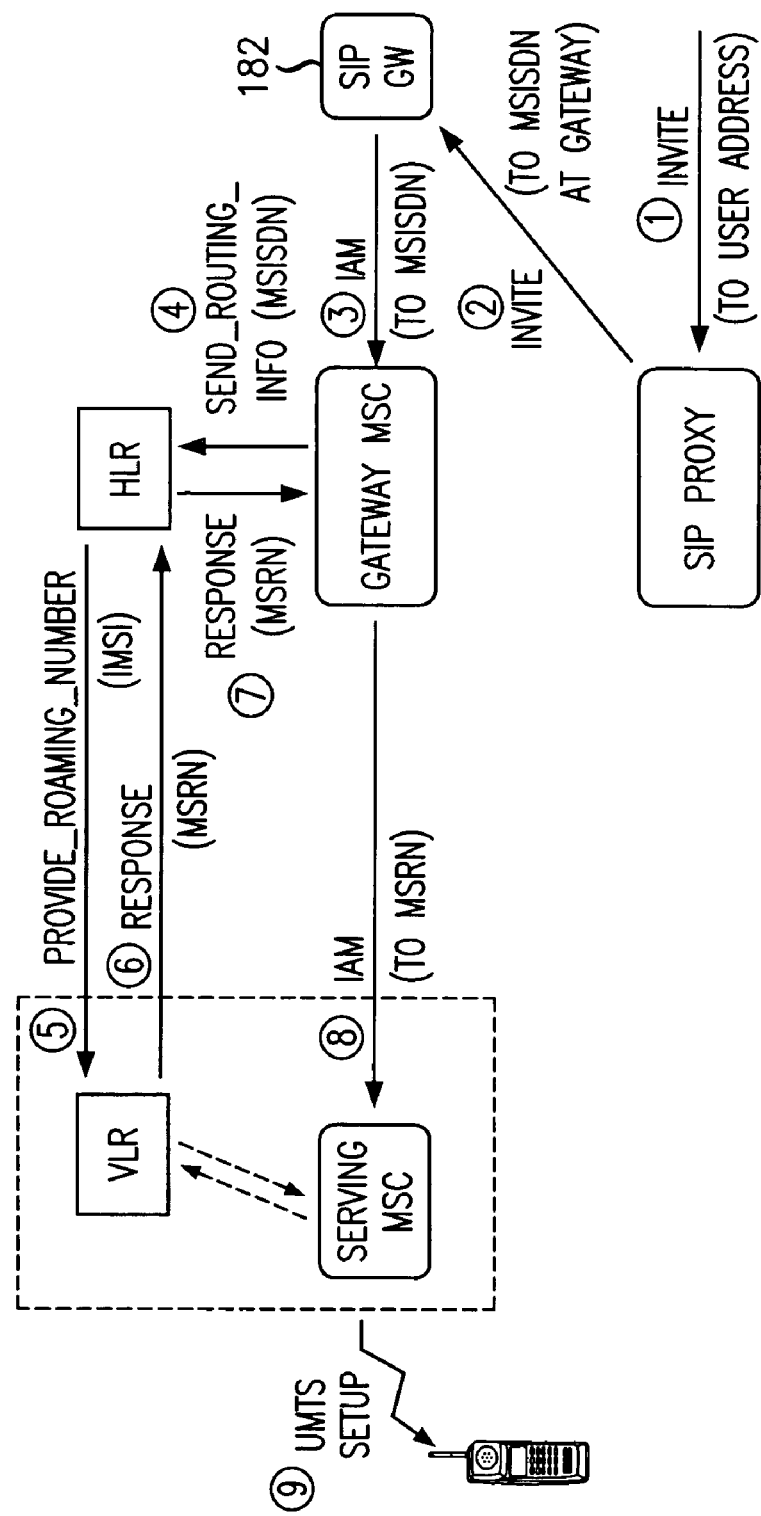
FIG. 18 shows a call setup procedure for approach 1—non-IP-enabled visited network.

Thus, as shown in FIG. 18, the call setup procedure for this procedure consists of a SIP INVITE message for the MSISDN at a SIP gateway 182, followed by the standard UMTS call setup procedure. Because the call must be directed to the MSISDN via the PSTN, connections to non-IP-enabled visited networks, under this approach, do not avoid triangular routing.

Figure 19:
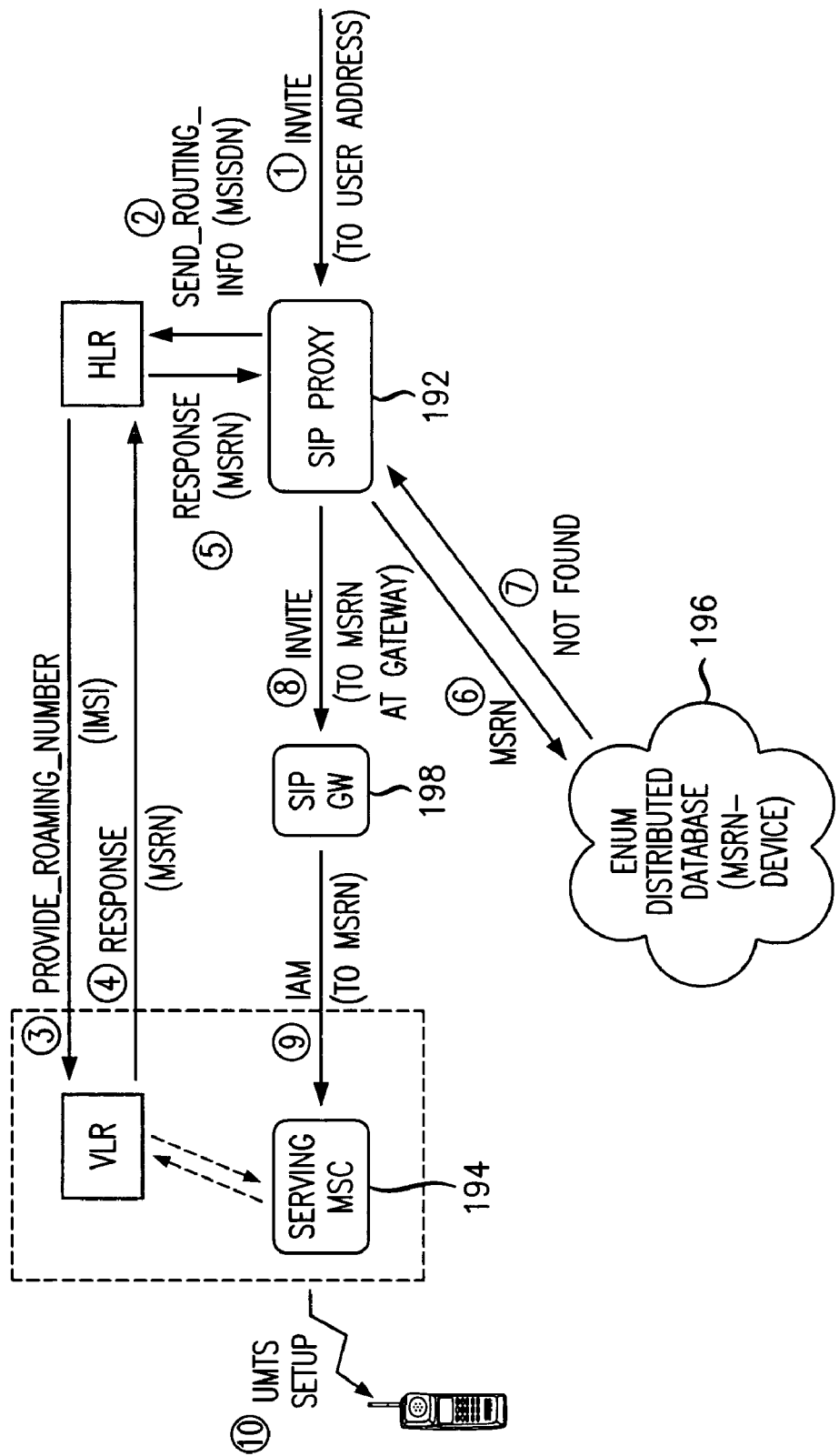
FIG. 19 shows a call setup procedure for approach 2—non-IP-enabled visited network.

In the non-IP-enabled visited network case, this approach uses the standard eight or ten UMTS MAP messages for registration. Call setup requires one SIP message, two ISUP messages, and four MAP messages. We can assume that the SIP proxy has only a small number of SIP gateways which it wants to use to reach gateway MSCs, and therefore the DNS lookup for the SIP gateway can be amortized widely over all Non-IP-enabled Visited Networks with Modified Call Setup In the modified call setup approach, the SIP Proxy 192 discovers that a serving MSC 194 does not support SIP. As shown in FIG. 19, this occurs at call setup time, when the Enum MSRN mapping database 196 does not return a mapping from the MSRN to a SIP address.

In this case, the SIP proxy 192 knows the MSRN to use to reach the user. Using TRIP, the proxy 192 can thus locate a SIP gateway 198 close to the serving MSC 194. Assuming that such a gateway is available, therefore, this approach therefore largely eliminates triangular routing even when visited networks do not support IP.

However, interoperation with non-IP-enabled visited networks makes this scenario's primary disadvantage, slow call setup, even worse. In this case, the lookup may potentially require four round trips between the originating and serving systems—the MSRN lookup; the failing Enum lookup; potentially, the DNS lookup of the SIP gateway; and finally the SIP INVITE message to the SIP gateway. If we assume the SIP gateway 198 is close to the serving MSC 194, however, the ISUP message sent from the SIP gateway 198 to the serving MSC 194 does not require another round trip.

This approach uses the standard eight or ten UMTS MAP messages for registration. Call setup involves four MAP messages, six DNS messages, one SIP message, and one ISUP message.

Non-IP-enabled Visited Networks with Modified HLR

Figure 20:
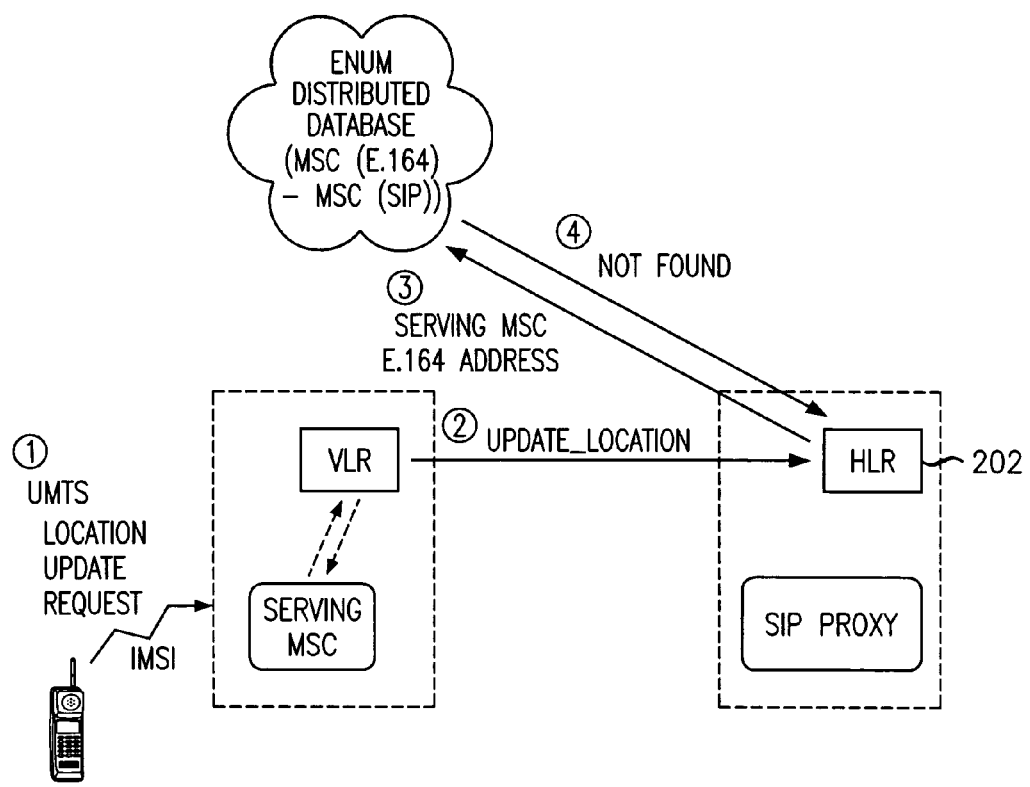
FIG. 20 shows a registration procedure for approach 3—non-IP-enabled visited network.

Finally, the approach to modify the UMTS HLR is different from the other two approaches in that it can detect non-IP-enabled visited networks at registration time. As shown in FIG. 20, when the modified HLR 202 attempts to determine the serving MSC's SIP domain based on its E.164 address, it discovers that there is no such domain available. It therefore knows that calls for this user must be handled in a circuit-compatible manner.

Figure 21:
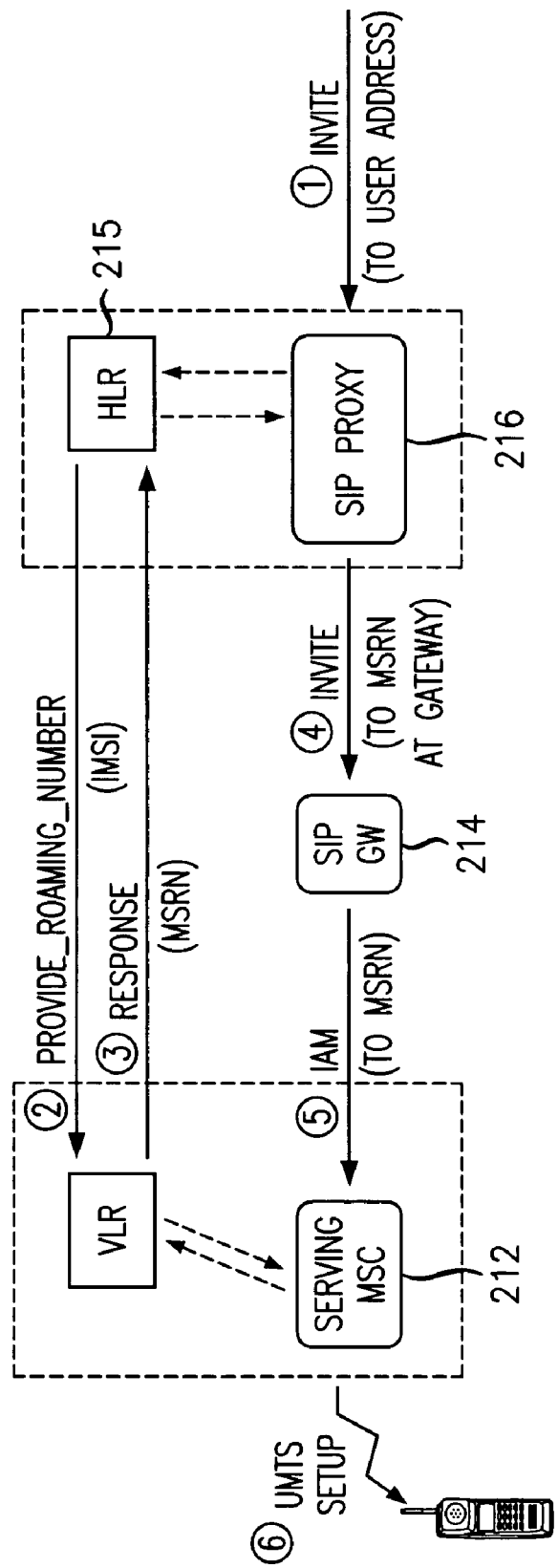
FIG. 21 shows a call setup procedure for approach 3—non-IP-enabled visited network.

FIG. 21 shows the resulting call setup procedure. Because the call must reach the serving MSC 212 through UMTS means, the HLR 215 must initiate the standard MSRN lookup procedure. Once a MSRN has been assigned, a SIP gateway 214 can be located for it, using TRIP. (This TRIP lookup can be done either by the HLR 215 or by the SIP Proxy 216.) The call is then placed through the SIP proxy 216 to the serving MSC 212.

Registration in this approach requires eight or ten MAP messages and two DNS messages. Call setup requires two MAP messages, four DNS messages, one SIP message, and one ISUP message. As in the case when serving MSCs are IP-enabled, communication between the SIP proxy and the HLR can be considered to be "free."

Because this approach discovers early on, at registration time, that visited networks do not support IP, in this environment this approach is better than the other two both for the call setup delay and for the total message load. Additionally, as with the second scenario but in contrast to the first, triangular routing is still largely avoided. Because of the need for MSRN lookup, however, call setup for non-IP-enabled visited networks is still significantly heavier-weight than it is with IP-enabled networks.

Analysis of non-IP-enabled Scenarios

In Section 4, we analyzed the performance of the three approaches in the ordinary cases, by assigning weights to every message (FIG. 10) and considering the total signaling load each protocol imposes on the network under a range of possible user behaviors (FIG. 12).

The behavior of the non-IP-enabled scenarios for the three protocols can be analyzed similarly. Table 6 shows the equations for the weighted signaling load for the three approaches in this case.

Figure 23:
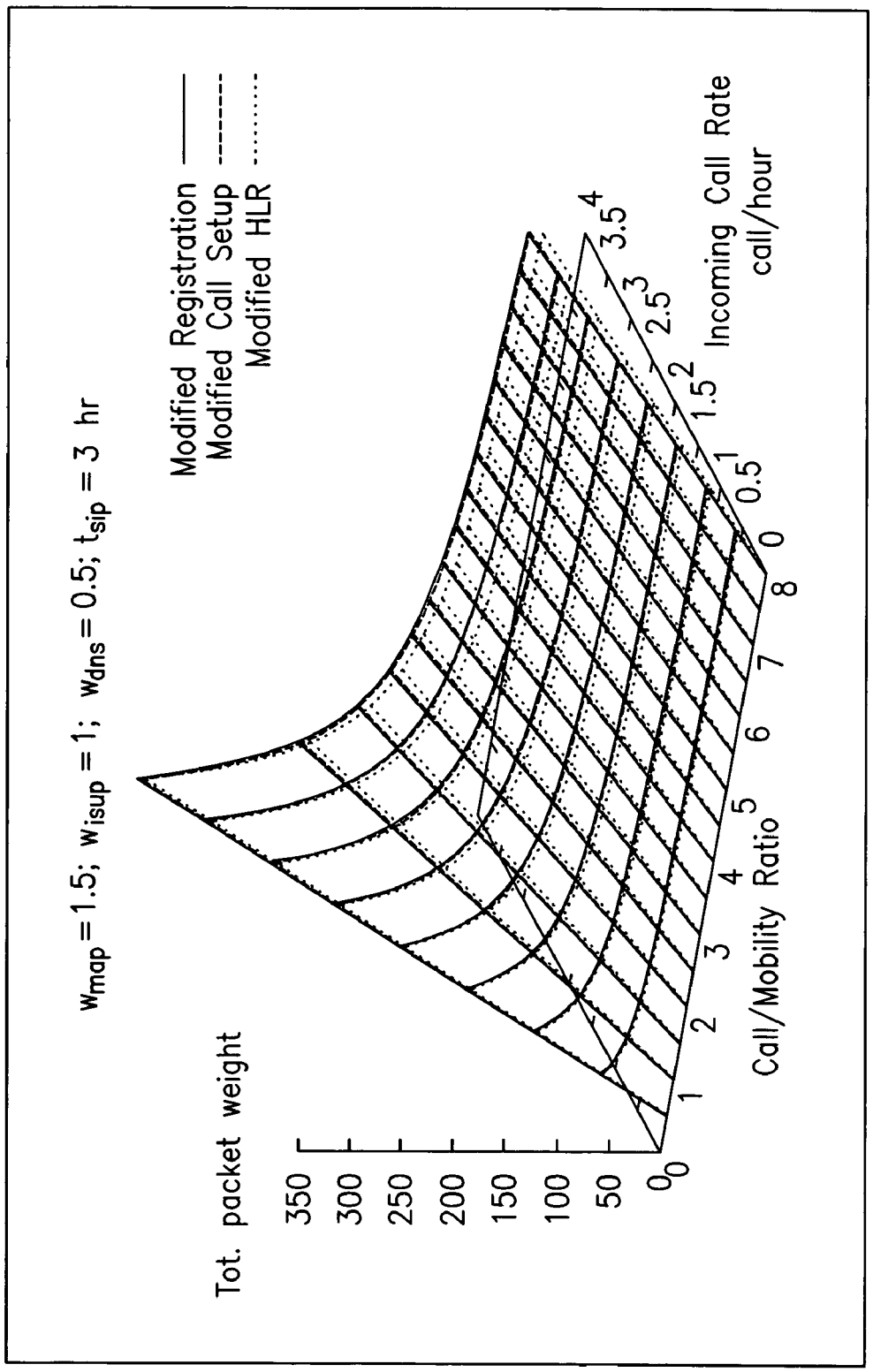
FIG. 23 is a graph showing weighted signaling load of the three approaches: non-IP-enabled visited network.

FIG. 23 graphs the table shown in FIG. 22 given the same assumptions as used in FIG. 14. The graph shows that when the visited network is not IP-enabled, the signaling load of the modified registration and modified call setup procedures are nearly equal. Indeed, analysis of the equations quickly shows that in this scenario the load of modified registration exceeds that of modified call setup by only $r_{bc}$ ($w_{isup}-6P_{us}w_{dns}$), or $0.4r_{bc}$ given the parameter values used for the graph. (Because this is a constant factor, the weights of modified registration and modified call setup never cross in this graph, so no line of intersection is shown in FIG. 23.)

The modified HLR procedure is consistently better than the other two approaches in this environment as well. The amount by which modified HLR outperforms the other approaches depends strongly on the degree to which call setup dominates the weight, since the three approaches have very similar registration procedures in these scenarios. The signaling load of modified HLR is lower by a factor of only 2% when the call-mobility ratio is very low (0.5), but is 20% lower with a moderate call-mobility ratio (4.0) and 30% lower with a high call-mobility ration (8.0).

Figure 24:
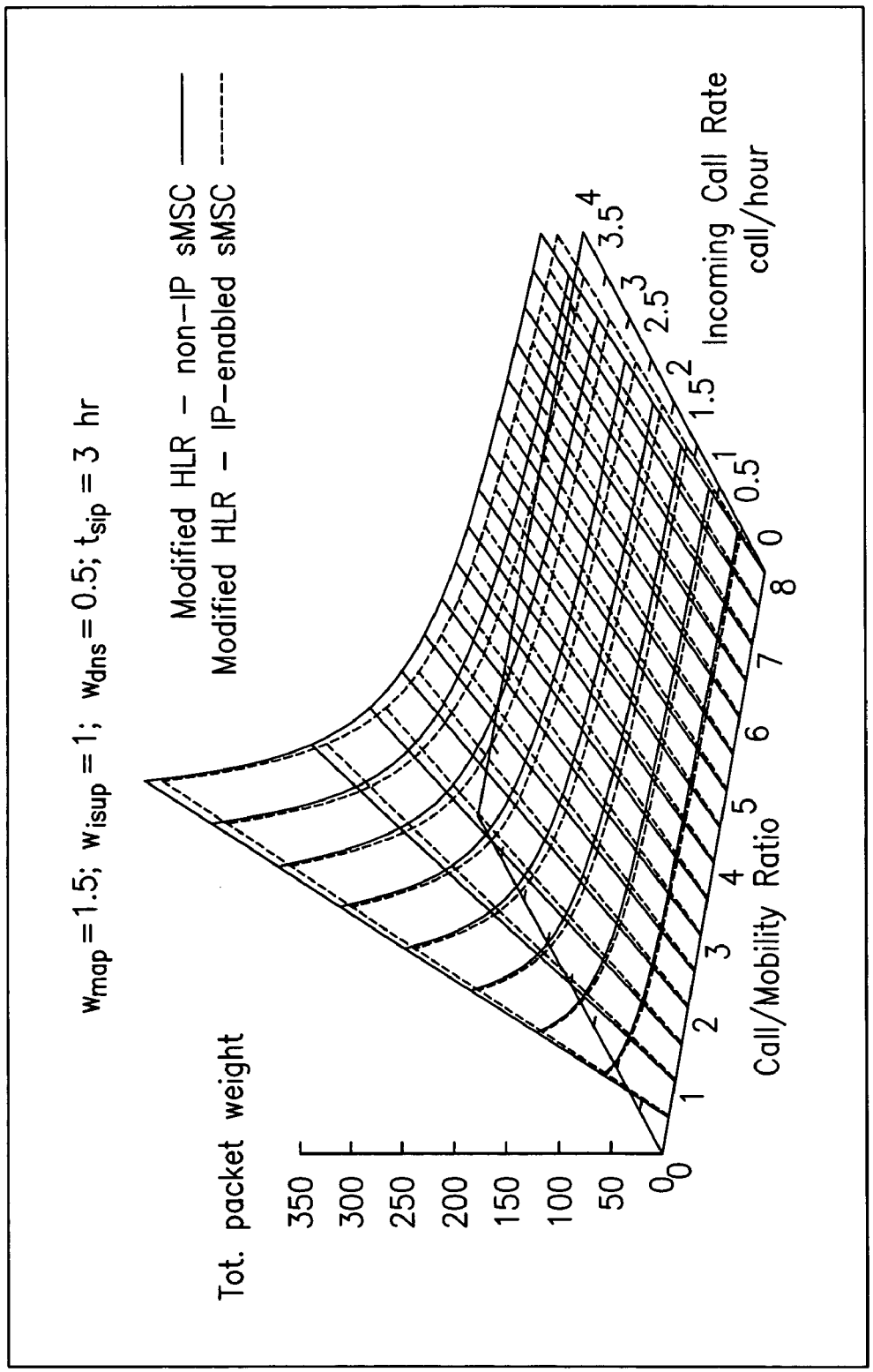
FIG. 24 is a graph showing a comparison of modified HLR signaling load with and without IP-enabled visited network

FIG. 24 compares the weights of the modified HLR approach with and without an IP-enabled visited network. We can see that the IP-enabled case is significantly more efficient than the non-IP-enabled case.

As would be expected, since the registration procedure uses the same number of messages in both cases, the relative benefit of the IP-enabled case depends on how much the message flow is dominated by call setup. The load advantage of the IP-enabled case varies, from approximately 5% when the call-mobility ratio is very low (0.5), through 36% for a moderate ratio (4.0), to approximately 65% when the ratio is high (8.0). The relative loads of the other two approaches are not shown, but are generally similar.

The comparative merits of the three approaches in the case of a non-IP-enabled visited network are therefore relatively similar to what they are in the case of the IP-enabled visited network described in Sections 3 and 4. Modified registration and modified call setup are roughly similar, and their relative merits depend on the exact assumptions made about packet weights and network characteristics. The modified HLR case is significantly better, though again it requires fairly invasive modifications of HLRs.

6 Some Conclusions

In this embodiment of the invention, We presented three novel schemes to directly interconnect UMTS mobile and SIP Internet telephony systems. Compared with the conventional approach of routing a call through PSTN, direct interconnection prevents triangular routing and eliminates unnecessary transcodings along its path. We analyzed the signaling message load of three approaches under a wide range of call and mobility conditions. The modified HLR scheme always imposes less signaling burden, typically 20–30% less than the other schemes, although it requires significantly greater modification to UMTS equipment. The efficiency of the other two approaches, modified registration and modified call setup, depends on the traffic parameters. When the incoming call rate and call/mobility ratio are both high, modified registration is more efficient. Modified call setup performs better otherwise. In the case when we must interoperate with visited networks that do not support IP, the total signaling burden is higher, by about 36% in an average case. The modified HLR scheme is still the most efficient in this scenario, with typically 20% less load.

7 EMCP System

In another embodiment, the invention provides a network architecture including the IP-based MSC. In the following subsection, we describe the software architecture of the call processing engine in detail.

A. Network Architecture

As opposed to traditional wireless systems, EMCP is inherently IP based and utilizes packet networks for both transport and signaling. It is built on top of an IP router based network and is composed of a cluster of commodity processors providing the MSC/VLR functionality and various gateways performing media conversion and transcoding. It supports standard circuit voice for wireless terminals like GSM phones, connects to existing circuit networks like the PSTN, and interfaces seamlessly with packet networks like the Internet. It can also support packet voice terminals with a packet radio interface like GPRS. We have developed an integrated solution for packet and circuit-based wireless access which uses EMCP for circuit wireless access and a packet data infrastructure for wireless IP access.

The call processing engine, which is described in detail later in this section, supports MSC functions like paging, call processing, and handoff, and VLR functions like mobility management and authentication for wireless circuit access. It controls end-to-end connection setup utilizing packet and circuit networks.

Figure 25:
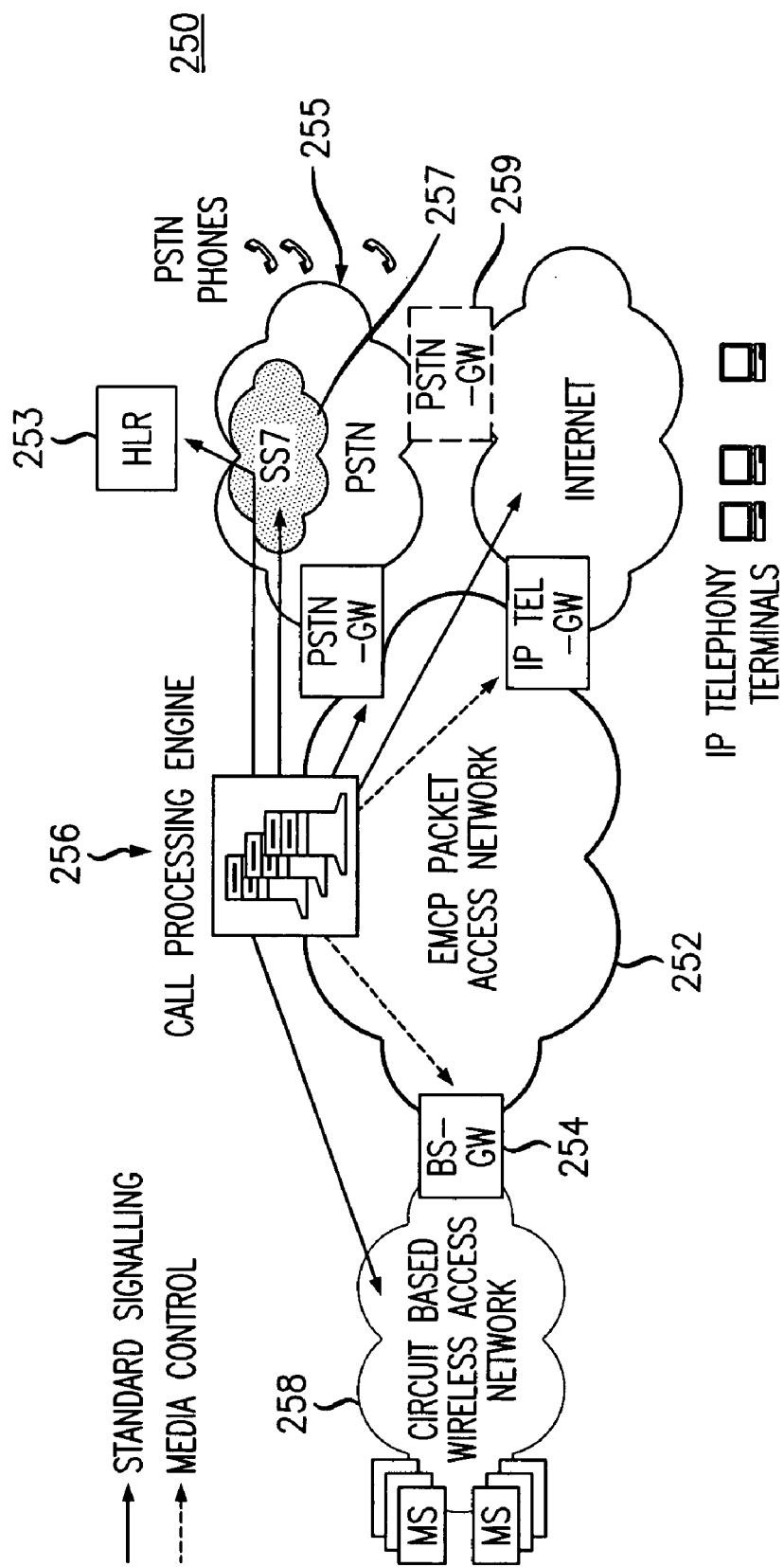
FIG. 25 shows an EMCP network architecture.
Figure 26:
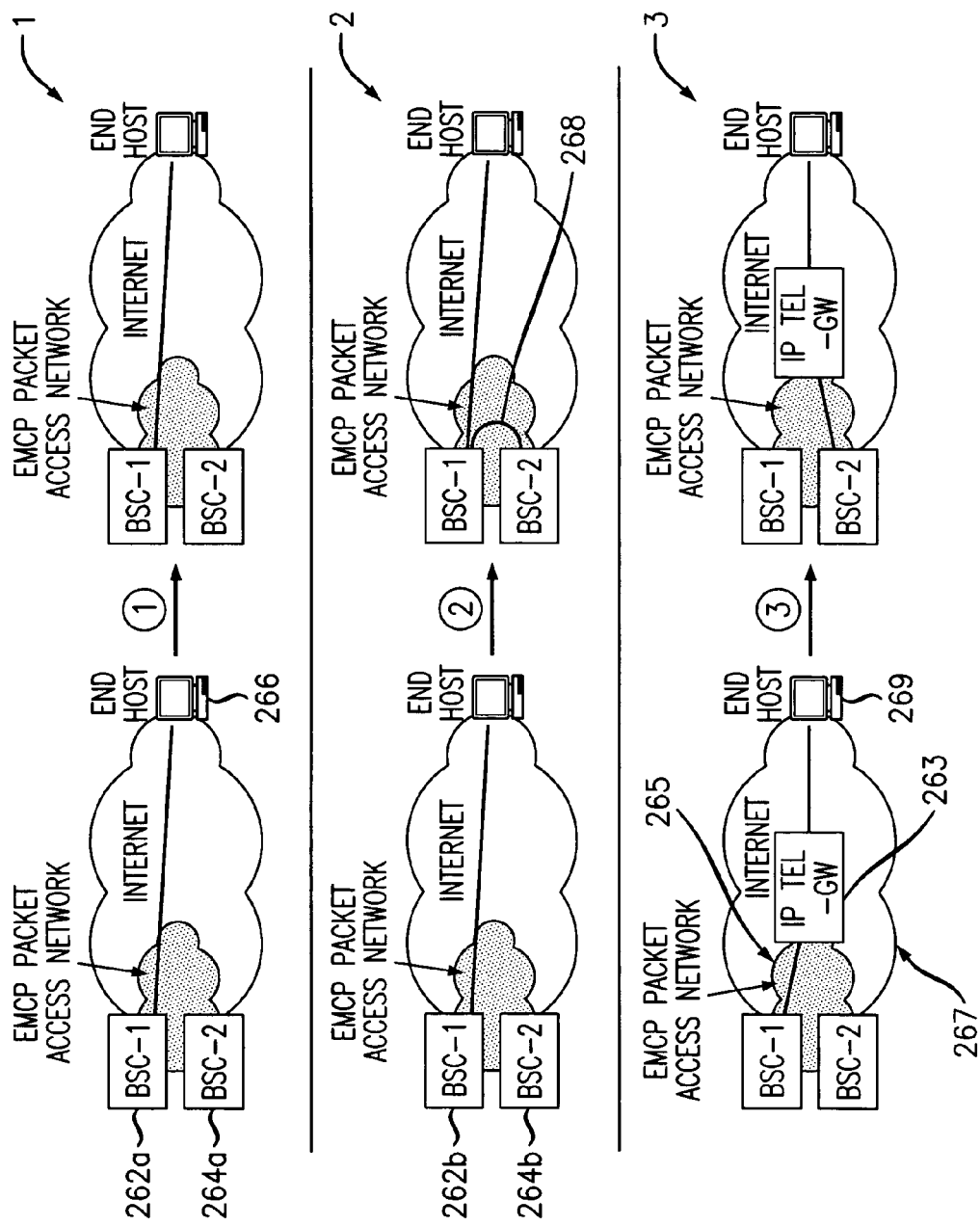
FIG. 26 shows possible approaches to handle handoffs.

FIG. 25 illustrates an overall architecture 250 of one embodiment of our system. EMCP provides wireless access to mobile users through a packet based access network 252. Within this network 252, the Real-Time Transfer Protocol over User Data-gram Protocol over IP (RTP/UDP/IP) is utilized for media transport. For signaling, we developed the Common Signaling Channel (CSC) protocol, which runs over the reliable Transmission Control Protocol (TCP/IP). One TCP connection is established for any pair of EMCP components that exchange signaling messages over the packet access network, and this connection is shared for all signaling traffic between the two. CSC is used to differentiate the signaling traffic of different call and mobility management activities. CSC/TCP can be thought of as a replacement of the Signaling Connection Control Part over Message Transfer Part (SCCP/MTP) protocol used in SS7 networks. However, only a small subset of SCCP capabilities are incorporated in CSC since the full functionality of SCCP is not required.

On the access side, EMCP introduces a base station gateway (BS-GW) 254. The BS-GW 254 is located between a BSC and a MSC and controlled by a call processing engine 256. Its purpose is twofold. At the transport level, it serves as a media gateway terminating circuit voice on the BSC side and packet voice on the MSC side. It can also be configured to perform vocoding functions to translate between different coding schemes. At the signaling level, it translates messages between the circuit network 258 on the BSC side and the packet network 252 on the MSC side. A BS-GW may not be needed in future once packet enabled BSCs become available, and the invention contemplates utility in embodiments in which a BS-GW is not included.

In order to provide the VLR functionality, a connection to the HLR 253 is needed. MAP, the user part of the SS7 protocol, is employed for this purpose. EMCP uses the request-and-response procedures of MAP to handle registration, authentication, handoff, and other mobility related functions.

The system connects to the circuit switched PSTN 255 via ISUP. EMCP uses ISUP, the call control part of the SS7 protocol, for connection and trunk management on the SS7 network 257. Since the EMCP access network 252 is packet based, a PSTN gateway (PSTN-GW) 259 is required. A PSTN-GW 259 performs media conversion between RTP/UDP/IP packet voice and circuit voice. It is controlled by the call processing engine 256 and, as with a BSC/BS-GW, it may perform possible transcoding between different coding schemes such as compressed wireless and uncompressed (μ-law or a-law) audio.

Its packet based access network positions EMCP well to provide IP telephony connectivity. H.323 and SIP may be used to control, among others, call setup and authentication in order to establish a virtual connection between to IP endpoints. Since the access network is packet based, the call processing engine may setup an end-to-end RTP/UDP/IP connection between the BSC/BS-GW and the IP telephony (e.g., H.323 or SIP) terminal or end host. This might, however, complicate inter-BSC handoff procedures. Three possible approaches 1, 2, 3 to handle handoffs are (see FIG.

26): 1. Switch the RTP/UDP/IP session from the old BSC 262 to the new BSC 264 at the end host 266. This approach may result in a long delay, as many packets may be lost during the handoff if the IP flow spans a long distance. 2. Let the first BSC 262*a* serve as an "anchor" 268 to extend the session to the actual serving BSC 264*b*. This approach reduces network efficiency, as the routing is no longer optimal. 3. Introduce an IP telephony gateway (IPTel-GW) 263 between the EMCP packet access network 265 and the Internet 267 to terminate one RTP/UDP/IP session between the end host 269 and the gateway 263 and another session between the gateway 263 and the BSC/BS-GW. If the access network is well engineered, local IP mobility can be used to perform handoffs with minimal disruption. Also, different coding schemes may be employed. We have chosen the third approach for the reasons mentioned. An implementation using SIP for IP telephony control is available. This interworking, even though it raises some interesting issues, is beyond the scope herein and is not discussed further. One important aspect, call delivery from an IP telephony to a mobile terminal, has been discussed herein, and is also addressed in detail in Jonathan Lennox, Kazutaka Murakami, Mehmet Karaul, and Thomas F. La Porta, "Interworking internet telephony and wireless telecommunications networks," in *Second IP Telephony Workshop (IPTel)*, New York, N.Y., April 2001, which is hereby incorporated herein by reference in its entirety.

Also, notice we can configure the system to use the Internet as a long-distance trunk if the end host in the Internet is actually an Internet Telephony gateway with the actual end terminal being a regular phone.

B. Call Processing Engine

Our call processing engine is deployed on a cluster of commodity processors (e.g., workstations or single board computers) and realizes MSC and VLR functions. The engine is separated from the transport network and can be viewed as a signaling gateway from IP telephony networks. It consists of a collection of functionally distributed servers; call processing and mobility management tasks are accomplished by their collaboration. Each server is realized as a distinct process with a well-defined interface towards other servers. This modular system design promotes functional extensibility of the system. A server program may be modified to upgrade functionality without affecting other existing servers as long as its interface is kept unchanged. Functional objects that perform strongly related functions are grouped into a server in order to reduce the overhead of message passing among servers. Finally, the servers may be distributed and replicated across processors to allow the system to scale.

Figure 27:
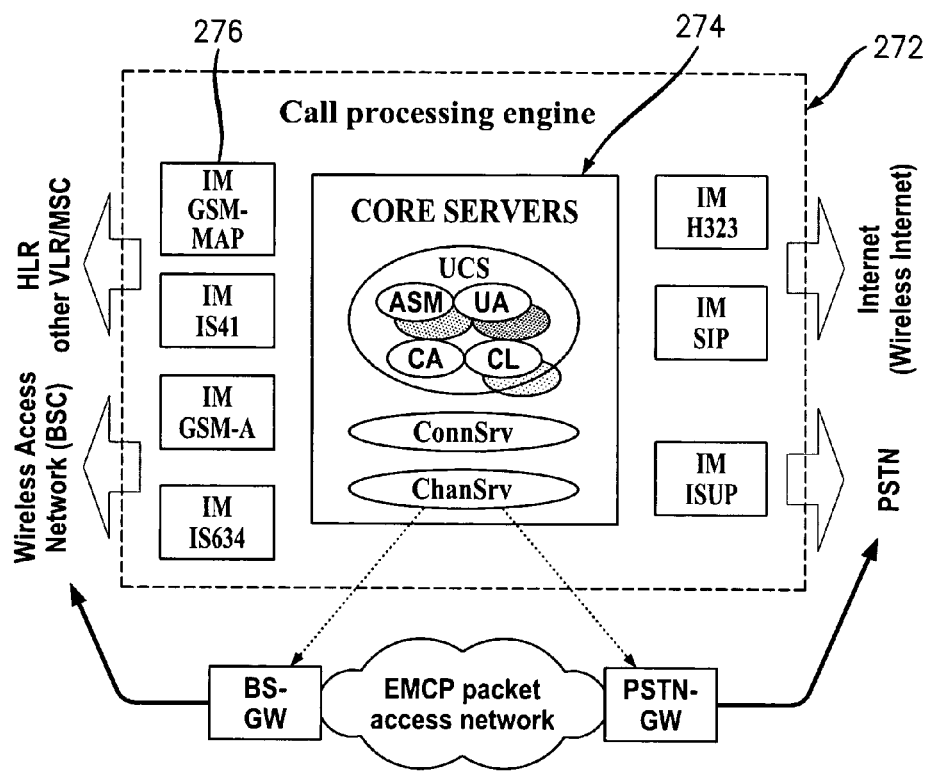
FIG. 27 shows a structure of an EMCP call processing engine.

FIG. 27 shows the structure of one embodiment of our call processing engine 272. It is comprised of two server classes: core servers 274 and interworking managers (IM) 276. Core servers 274 perform call processing and mobility management tasks common to any wireless system. Interworking managers 276 act as protocol gateways to internal core servers 274, isolating them from external signaling protocols, and thereby allowing the core servers 274 to evolve independently of these protocols.

Interworking managers allow core servers to accommodate different sets of standard interfaces. For example, the call processing engine can accommodate IS-634 base stations used with CDMA systems and GSM based base stations by introducing an IM-IS634 as well as an IM-GSM-A. An IM-IS41 or IM-GSM-MAP acts as a signaling gateway to a HLR as well as external VLR/MSCs. IM-ISUP provides a signaling connection to the PSTN network. If a service provider uses Internet trunks as opposed to PSTN trunks, IM-H323 or IM-SIP is employed instead of IM-ISUP. IM-H323 or IM-SIP can be also used to accommodate wireless IP packet terminals with IP telephony clients, as we presented in the previously incorporated by reference article: Jonathan Lennox, Kazutaka Murakami, Mehmet Karaul, and Thomas F. La Porta, "Interworking internet telephony and wireless telecommunications networks," in *Second IP Telephony Workshop (IPTel)*, New York, N.Y., April 2001.

There are three types of core servers: A channel server (ChanSrv), a connection server (ConnSrv), and a user/call server (UCS). Channel servers manage device resources, such as transport channels and vocoders, allocated during call setup and deallocated during call release. Channel servers send media gateway control messages to instruct the gateways on resource allocation.

Connection servers coordinate the allocation of channel resources to establish an end-to-end connection. Connection Servers contain knowledge of the network configuration from the viewpoint of the MSC. They instruct the appropriate channel servers to reserve needed channel resources internal to the MSC. They also ask interworking managers to send standard signaling messages to external components to reserve external channel resources. For example, the connection servers may reserve network trunk resources using ISUP control messages through IM-ISUP.

User/call servers maintain information on the registration status of mobile devices currently roaming within the service area of the MSC and record call activities involving a particular mobile device. A UCS is composed of four types of main objects: user agent (UA), access session manager (ASM), call (CL), and call association (CA) object.

Mobility management tasks are performed by user agent and access session manager objects. One user agent object exists per each registered roaming mobile user and provides VLR functions. It maintains registration status and manages user service subscription profiles down-loaded from the HLR at the initial power-up registration of a mobile device. It also performs paging to locate a mobile device and keeps authentication parameter information for the user. The access session manager object maintains a mobility management connection with a mobile device. It performs authentication, ciphering, and handover control over this connection.

The call object embodies the basic call state model of IN (Intelligent Network) for a mobile user. It uses a half call model and manages call status information specific to a single end user. Detection points for service features are embedded in this object.

The call association object is introduced in UCS to maintain the associations among multiple call objects belonging to a single mobile user. If a user is engaged in multi-party call, such as a call waiting scenario or during three-way calling, multiple call objects are created in order to maintain a distinct state of each call. In the case of call waiting, for example, one call object with connected call state represents a call with an existing partner, while another call object with alerting state is created for a newly arriving call. The call association object associates these call objects. It indicates which call object is currently using the channel. The call association object accepts a call modification operation from call objects, investigates the current multi-party call relationship information among the call objects for the user, and translates it into a logical connection modification operation defined between call association object and the connection server. Since the call object does not have any association information with other call objects belonging to the same user, the call association object must properly interpret a call modification operation from a call object. For example, a call release request from a call object is translated into a release of a transport leg towards a partner if the call association object indicates that a user is involved in a multi-party call. On the other hand, if this is the only call in which the user is involved, the release request is translated into an entire connection release including the leg towards the mobile. These connection modification operations are independent of the underlying traffic channel resources so that call and call association objects are sufficiently general to be applicable to any communication platform.

8 GSM Case Study

Next, we show how our generic architecture described in the previous section can be applied to provide wireless access using a specific wireless access protocol, in this case GSM. We illustrate the interworking and collaboration of the individual call processing components by discussing one procedure in detail: call setup from the PSTN to a mobile. Then, we describe our system implementation and setup that we use to make wireless calls using standard wireless phones and access equipment.

A. Scenarios

When a GSM mobile device powers up (or enters a new MSC coverage area), it must register with the network. For this, the mobile transmits a unique identification code, its International Mobile Subscriber Identity (IMSI), to the MSC. From this code, the MSC determines the mobile's HLR and informs this HLR of the mobiles current location. The HLR stores this location information and responds with profile data for the mobile. Finally, the MSC acknowledges the mobile's registration request. Several ancillary tasks, such as authentication, ciphering, and location cancellation may be performed under various circumstances. For brevity, we will not discuss these and instead proceed to the network-to-mobile call setup procedure.

When a call is initiated towards a mobile, the PSTN determines from the dialed number, called the MSISDN number, that it is destined for a mobile telephone, and directs it to an appropriate gateway MSC (GMSC). The MSISDN identifies a mobile, but cannot be used to route a call since the mobile is moving. Instead, the GMSC uses it to identify the mobile's HLR and request routing information. The HLR, in turn, interrogates the VLR at the mobile's current location which allocates and returns a temporary Mobile Station Routing Number (MSRN). The MAP protocol is used for this exchange (see FIG. 28). In EMCP, the VLR functionality is provided by UA objects, and it is the UA that allocates the MSRN.

Figure 28:
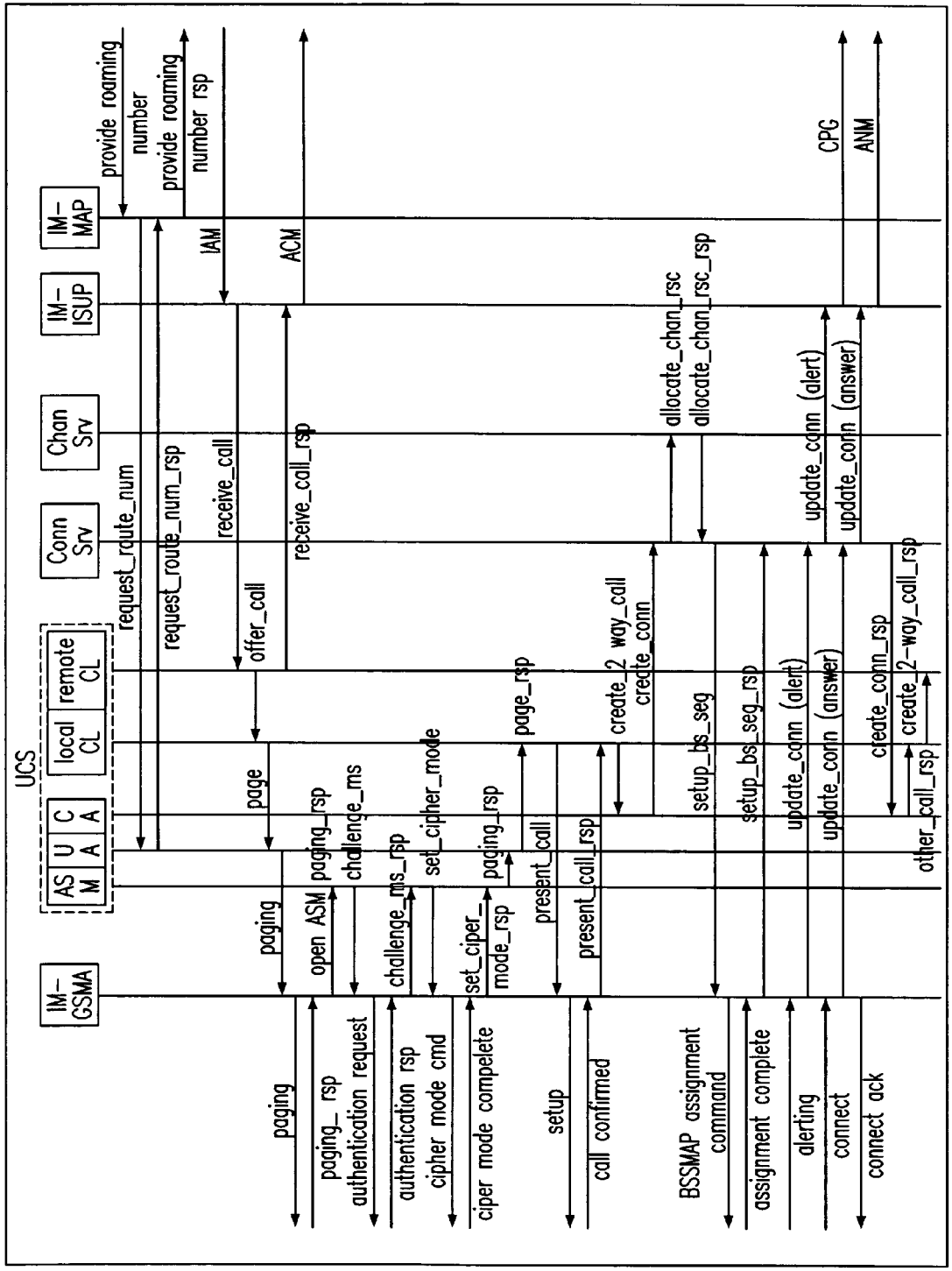
FIG. 28 shows an EMCP procedure: mobile terminated call set up flow.

This MSRN is used to route the call to the serving MSC using the ISUP protocol. The Initial Address Message (IAM) initiates a call setup. The UA uses the MSRN contained in the IAM to match it with a mobile user. It then sends paging request to the mobile to determine whether the mobile is actively in coverage, and to ask it to establish a signaling connection with the MSC. A series of ancillary tasks may be performed at this stage. FIG. 28 shows the authentication and ciphering procedures, depicting the exact flow used in our experiments, discussed below.

Next, a setup message is generated towards the mobile, providing additional information such as the type of service requested and the caller's number. Once the mobile accepts, the necessary channel resources, including the radio spectrum, are allocated. Then, the mobile generates an alerting signal to inform the user, and indicates this to the MSC, which in turn relays this information to the next switch in the PSTN. The call setup procedure is complete when the mobile user accepts the call and the corresponding message is relayed to the MSC and the PSTN.

B. System Implementation

Figure 29:
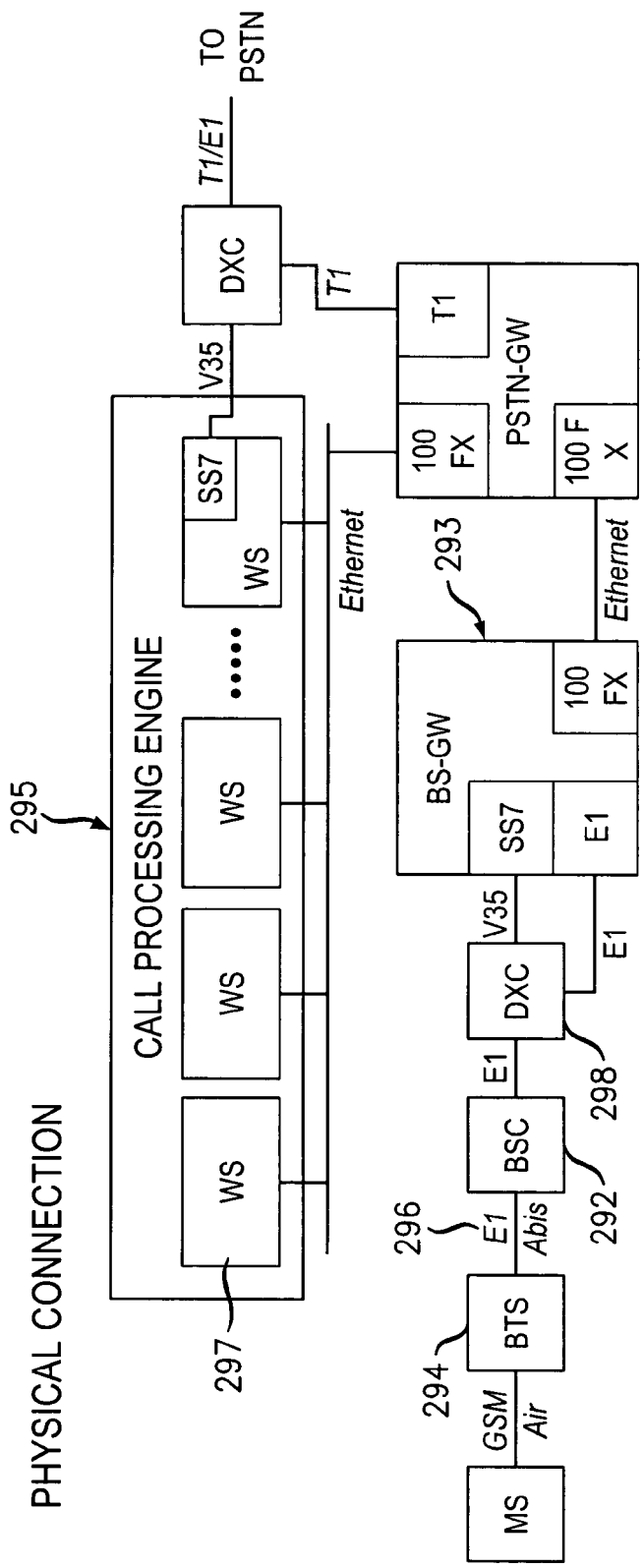
FIG. 29 shows an EMCP network setup.

FIG. 29 shows the setup of an embodiment of our system for GSM access as it exists in our lab. FIG. 29 does not show components needed to support IP telephony; for details on this, see the previously incorporated by reference article: Jonathan Lennox, Kazutaka Murakami, Mehmet Karaul, and Thomas F. La Porta, "Interworking internet telephony and wireless telecommunications networks," in *Second IP Telephony Workshop (IPTel)*, New York, N.Y., April 2001.

The radio network consists of Lucent GSM 900 cubes that act as BTSs 294 connected to Lucent BSCs 292 through E1 lines 296. The BTSs 294 communicate with standard GSM phones through ceiling mounted antennas. All of this equipment is standard and unmodified.

Each BSC 292 interfaces to the MSC through an E1 line carrying an SS7 signaling link over one time slot and 4 compressed voice streams per time slot over multiple time slots. The signaling and media streams are separated using a standard Digital Cross Connect (DXC) 298 and sent to different destinations. The SS7 signaling stream is sent to a BS-GW 293 for conversion to IP and eventual shipment to the call processing engine 295, more specifically, IM-GSM-A. The media streams are sent over an E1 line for conversion to RTP/UDP/IP for eventual transport to the other endpoint in the call, i.e., a media gateway or a mixer used in conference calls. This complex of DXC and BS-GW is required since the BSC at present does not support an IP interface to these streams. Eventually, with the availability of BSCs supporting IP interfaces, a single IP connection to the IP transport network will suffice.

The PSTN-GW functionality is performed by a Lucent PathStar router with 100BaseFX and T1 cards and support for voice transcoding. The circuit signaling and media streams are combined using a DXC for transport over an E1 or T1 line, as appropriate. The next hop PSTN switch and HLR are all commercial Lucent components present in other Lucent test labs or simulated by a Tektronix K1295 SS7 protocol simulator.

The call processing engine 295 runs on a cluster of Sparc Solaris workstations 297 (WS) connected to a 100BaseT network. IM-GSM-MAP and IM-ISUP run on Sparc servers with UltiComm SS7 cards that allow connectivity to the PSTN, the gateway MSC, and the HLR via a DXC.

The cluster of Sparcs 297 making up the call processing engine 295, the BS-GW, and the PSTN-GW are all connected to an IP network, the EMCP packet access network, built from multiple hubs and routers. The PathStar router, in addition to providing the PSTN-GW functionality, also acts as a router within the access network.

9 System Performance

An important goal in evaluating the performance of EMCP is to study how it handles different traffic patterns. Since the traffic pattern may vary significantly depending on how and where a wireless system is deployed, any insight in a system's ability to handle a certain user population for a desired traffic mix represents valuable information.

The traffic pattern we consider is given by the average number of registrations and calls generated by each user; this provides a good indication of user behavior in terms of calls and mobility. Given an average registration and call arrival rate per user, we strive determine the supportable user population while satisfying a certain delay bound. We study how EMCP handles changing call-to-mobility ratios with both experiments and analysis. The analysis is discussed in the following section. For the experimental results, we next describe our experiment setup and parameters. Then, we present a delay curve and establish an upper delay bound. Finally, we perform the load testing and discuss the results.

A. Experiment Setup and Parameters

The following setup was used to perform load testing on the system. The EMCP core servers and interworking managers for ISUP, GSM-MAP, and GSM-A (FIG. 4) run on two Ultra-60 Sparc computers connected to the same fast Ethernet (100 Mb/s) subnet. A single instance of each server was used for the experiments. Simulators were developed to provide the functionality of the BS-GW on one side, and the functionality of the PSTN-GW and SS7 network on the other side. These simulators run on another Ultra-60 Sparc computer connected to a neighboring sub-net via a 10 Mb/s Ethernet interface and generate load towards the EMCP system. All three Ultra-60 systems have 512 MB of RAM and run Solaris 2.6. All three have dual UltraSparc-II CPUs, the first two run at 360 MHz and the third at 296 MHz.

FIGS. 30 and 31 list the parameters used to evaluate performance of our system. All event arrival rates including call arrival, registration, and boundary crossing rate have the unit "events per hour per user." MO and MT stand for Mobile Originated and Mobile Terminated call, respectively. All call arrival patterns are Poisson, hence independent of any other event. The registrations are, however, only "near" Poisson, since, for the purpose of this experiment, we assume that no registrations or handoffs can be performed during an ongoing call.

For all experiments, a call request includes the call setup and the corresponding release. A registration request can take two shapes. An inter-BSC (intra-MSC) registration involves a location update procedure, whereas an inter-MSC registration involves a detach procedure followed by an attach. An inter-MSC registration is invoked when a mobile user crosses the boundary between two MSCs.

There are seven independent variables 302 in FIG. 30. In order to keep the experiment size tractable, only three are changed to evaluate system performance under various conditions. They are, average number of registered users N, call arrival rate $l_c$, and registration rate $l_r$. The remaining four parameters, number of processors P, ratio of MO calls $r_c$, call holding time u, and inter-MSC registration ratio $r_r$ are all fixed at their nominal or typical values. In particular, $r_c$ is set to 2/3, achieving a MO:MT ratio of 2:1; this ratio represents a good characterization of mobile user behavior in the European wireless market. For brevity, we use a fixed P in this study. Previous work on distributed call processing has addressed this issue, and we expect EMCP to exhibit similar performance in this regard. FIG. 31 shows derived parameters 312.

B. System Response

The first set of experiments we conducted were designed to observe call setup latency versus call load, for different N. The main purpose is to illustrate system response characteristics and establish an upper delay bound.

We define call setup latency t as follows. It measures the time between the first message of a call setup request send to the MSC and the alerting message send back to the originator. It is always measured at the call initiator side. For MT calls, t is the elapsed time between initiation of the provide roaming number request and receipt of the corresponding alerting message, called call proceeding (CPG) in ISUP, measured at the PSTN switch simulator (see FIG. 28).

Similarly, for MO calls, t represents the elapsed time between initiation of the service request message and receipt of the GSM-A alerting message, measured at the BS-GW simulator.

Figure 32:
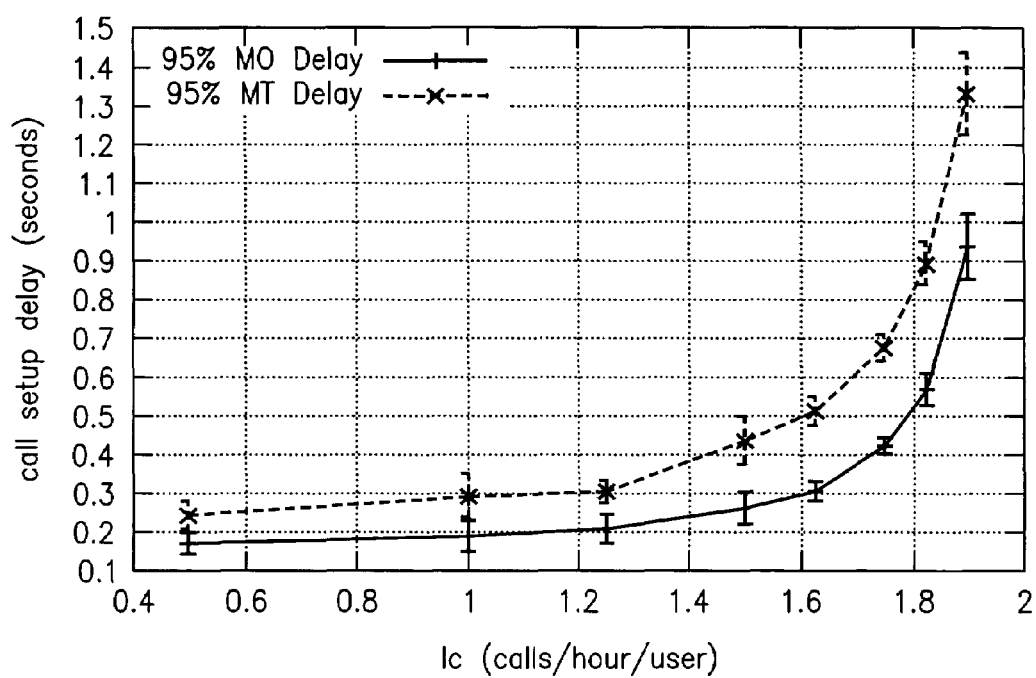
FIG. 32 is a graph showing system response time for N=200K and $l_r$=1.0.

FIG. 32 shows the response time under increasing call load for a mobile user population N of 200K, as $l_c$, vs. call setup delay (MO:MT=2:1). The offered load includes registrations at the rate $l_r$=1.0. The vertical slim bars are 90% confidence intervals (CI) of call setup delay. Notice that a 90% CI differs from a 95% MO delay, since the latter means 95% of MO calls have a setup latency less than or equal this value. Both 95% MO and MT delays have their own 90% CI.

From FIG. 32 it is evident that under these conditions the delay curve has a "knee" around 1.6–1.8 calls/hr/user. Its overloading point is reached at about 1.9 calls/hr/user. To give a quantifiable definition of "knee," we define it to be the operating point where the system's 95% MO delay reaches 500 ms. We cannot apply this criteria to both 95% MO and MT delays at the same time, but in general the 95% MT delay is similarly capped, at about 750 ms in this case, since the MO:MT ratio is fixed. Even though other delay values are feasible, we selected these in order to evaluate the system under relatively high load without reaching overload; they are within the target performance requirements for wireless systems.

Using this definition, the system configuration as in FIG. 32 reaches the target operating load at about 1.8 calls/hr/user. In other words, with an individual call arrival rate of about 1.8 calls/hr/user, the system can support up to 200K users while still guaranteeing that 95% of its mobile originated calls have a latency of at most 500 ms. We enforce this delay bound in all our experiments.

C. Scalability Results

Having established the target operating point, we proceed with our initial goal to study the system performance in terms of supportable user population for varying usage patterns. More specifically, we evaluate the supportable population N for a large range of mobile registration rates $l_r$ and call rates $l_c$ while operating within our delay bound of 500 ms. The results are shown in FIG. 33, as $l_c$ vs. maximum supportable population N.

This chart shows that the EMCP system is stable across a wide range of load conditions. Each curve 332a–d with a unique registration rate $l_r$ shows a similar increasing trend as the call arrival rate $l_c$, decreases. At lower $l_c$, mobile users make fewer calls and registrations represent a higher percentage of the total system load. Therefore, a higher $l_r$ at a lower $l_c$ will cause the overall system to support much fewer users compared to a lower $l_r$. This is illustrated by the widening gaps between the four curves as call arrival rate $l_c$, decreases. Conversely, the system characteristics become almost identical as the call arrival rate increases, irrespective of the mobile registration rate.

Figure 33:
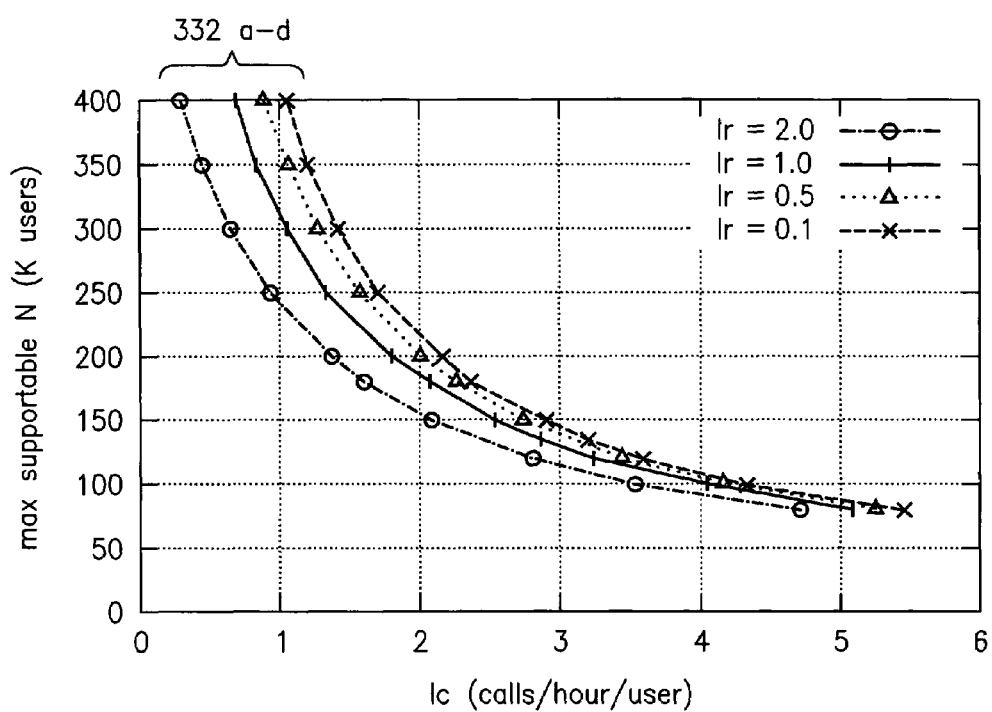
FIG. 33 is a graph showing supportable population under different $l_c$ and $l_r$.

Obtaining the data points for FIG. 33 involves lengthy experiments. Each point N,$l_c$, $l_r$ has to be determined while operating at the desired operating point. To determine an operating load, we can rely on load-delay data similar to those shown in FIG. 32. Each point in that chart represents a unique system load (i.e., a unique tuple {N,$l_c$, $l_r$}). To obtain a data point for FIG. 33, we need to determine the load-delay point where the 95% M O delay consistently reaches 500 ms.

One option is to start with a certain load and gradually increase the load until the desired operating point is reached. Alternatively, an approach similar to binary search may be deployed. Either way, an exact value cannot be obtained due to system fluctuations. In our experiments, we determine the target operating load through interpolation of the two closest measured data points; that is, by intercepting the horizontal line t=500 ms with either the linear segments or best-fit curve of the load-delay chart. The error-of-margin in terms of N·$l_c$ introduced by this interpolation is 7.8 Kcalls/hr (or 2.2% of the call load) on average and does not exceed 15 Kcalls/hr (or 4.3%).

In order to minimize measurement noise, each unique load in FIG. 32 is determined by running 20 rounds with 90 sec measurement intervals. Taking into account startup and cleanup actions, such as setting up an initial set of calls and releasing residual active calls, each round requires about 3 to 4 minutes, for a total of over an hour for a single load-delay data point in FIG. 32. About 4 or 5 unique loads are needed to achieve acceptable values for interpolation. The total time to determine a single data point for FIG. 33 is around 6 hours, resulting in a total of about 250 hours for the load experiment overall.

10 Analysis

High load experiments provide valuable insight into different operating environments. However, the experiments required to obtain the desired data are of difficult and time consuming nature. This has prompted us to seek and derive an analytical model that describes our system performance with sufficient precision. We first present our system model. We then argue why our system fits into the framework of this model. Finally, we evaluate its effectiveness.

A. System Model

Our main goal is to analytically determine the user population that our system can support for differing traffic patterns. More specifically, given a registration rate $l_r$ and a call rate $l_c$, we strive to determine the supportable user population $N(l_c, l_r)$.

We can model the performance of our system, i.e., the supportable user population, in terms of available resources shared among requests. A natural choice is to use the service time for each type of request, since they compete for the CPU cycles available to the EMCP system. This assumes a system where all other resources, such as network bandwidth and memory, are plentiful, and the first limiting resource is the processing capacity. With this assumption, the sum of CPU cycles per second spent on registrations and calls adds up to 1.0, and we arrive at the following formula:

$$1.0 \text{ sec} = N \cdot (l_r \cdot p\_l_r + l_c \cdot p\_l_c);$$

where $p\_l_r$ and $p\_l_c$ denote the percentage of system CPU consumed on average by a registration and call, respectively. With this, the supportable user population is given by:

$$N = 1.0 \text{ sec}/(l_r \cdot p\_l_r + l_c \cdot p\_l_c);$$

We can transform this equation to reach our desired form as follows:

$$N(l_c, l_r) = C/(l_r + \alpha \cdot l_c) \quad (1)$$

where $C = 1.0/p\_l_r$ represents the normalized maximum supportable user registration load (or capacity) and $\alpha = p\_l_c/p\_l_r$, the CPU cost ratio between an average call and an average registration. We call α the call-to-mobility CPU cost ratio.

Equation (1) models our system performance. It requires values for constants C and α; these depend on the system at hand. If we can obtain these values, we can use Equation (1) to determine an approximation for N for any given traffic mix $\{l_c, l_r\}$ without having to resort to lengthy high load experiments.

B. Linear Regression

Figure 34:
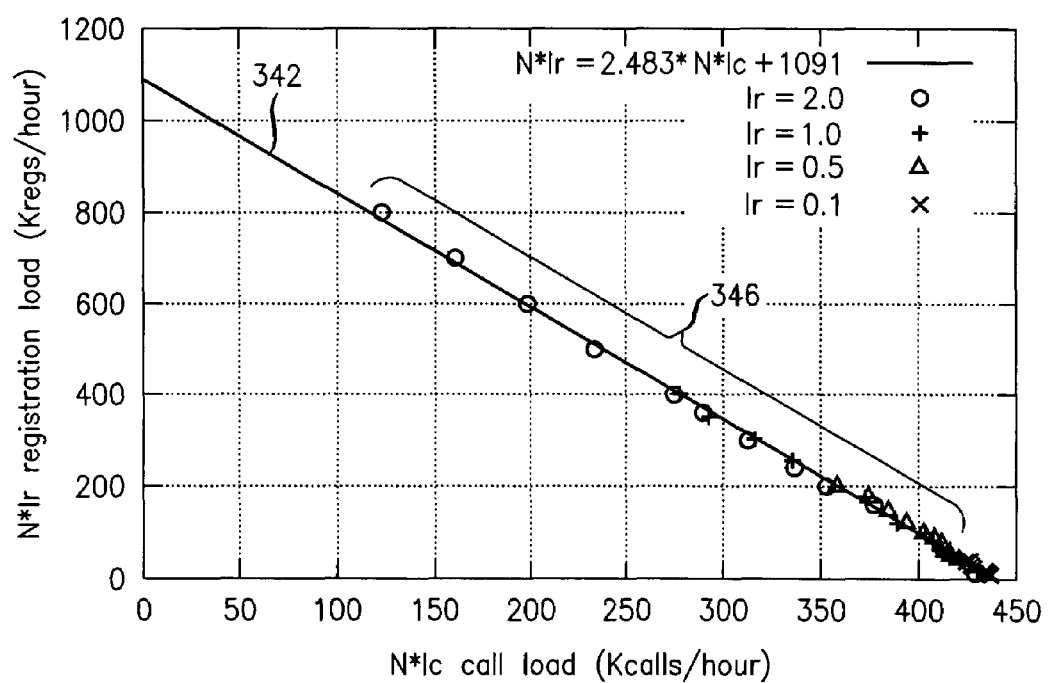
FIG. 34 is a graph showing registration load versus call load.

Our analytical model, as expressed in Equation (1), assumes that there exists a linear relationship between registration and call load. We can expect our model to achieve a good approximation of the actual system performance only if the system exhibits a near-linear relationship in terms of registration and call load. FIG. 34 illustrates that this is indeed the case.

FIG. 34 shows registration load versus call load of our system using our measurements from the previous section, as N·$l_c$ vs. N·$l_r$. The measured data points 346 clearly indicate a near-linear relationship. We can resort to statistical methods to quantify the correlation. If we apply linear regression based on least square fit on our measured data set, we obtain the linear estimation formula:

$$N \cdot l_r = -2.483 \cdot N \cdot l_c + 1091. \quad (2)$$

The line 342 depicting the linear estimation formula is shown in FIG. 34. The value −2.483 describes the slope derived by linear regression over all data points. It represents the number of registrations equivalent to one call in terms of CPU consumption. The value 1091 is the intercept of the linear regression at zero call load. It represents the interpolated maximum registration load that the system can support.

We can quantify the effectiveness of our linear regression as follows. The absolute error in predicting N·$l_r$ using Equation (2) is determined by $|(1091-2.483 \cdot N \cdot l_c) - N \cdot \text{measured}\_l_r|$. It has a mean of 7.7 Kregistrations/hr and a worse case limit of 16.5. The range of the error does not change significantly with respect to $l_c$ or $l_r$. Therefore the relative error introduced by Equation (2) is roughly inversely proportional to N·$l_r$.

The relatively small error introduced by our liner regression indicates that there indeed exists a near-linear relationship between registration and call load. This implies that our model may provide an effective approximation of the actual system performance if we can identify values for the two constants. We address this next.

C. Evaluation

Equation (1) requires values for constants C and α. These depend on the system at hand and can be determined by evaluating the system performance for a limited number of different loads. One way of obtaining these values is to rely on our previously measured data. Linear regression on our load data provides us with the necessary values as indicated in Equation (2). We can transform Equation (2) into the form of Equation (1) and get:

$$N(l_c, l_r) = 1091/(l_r + 2.483 \cdot l_c). \quad (3)$$

Figure 35:
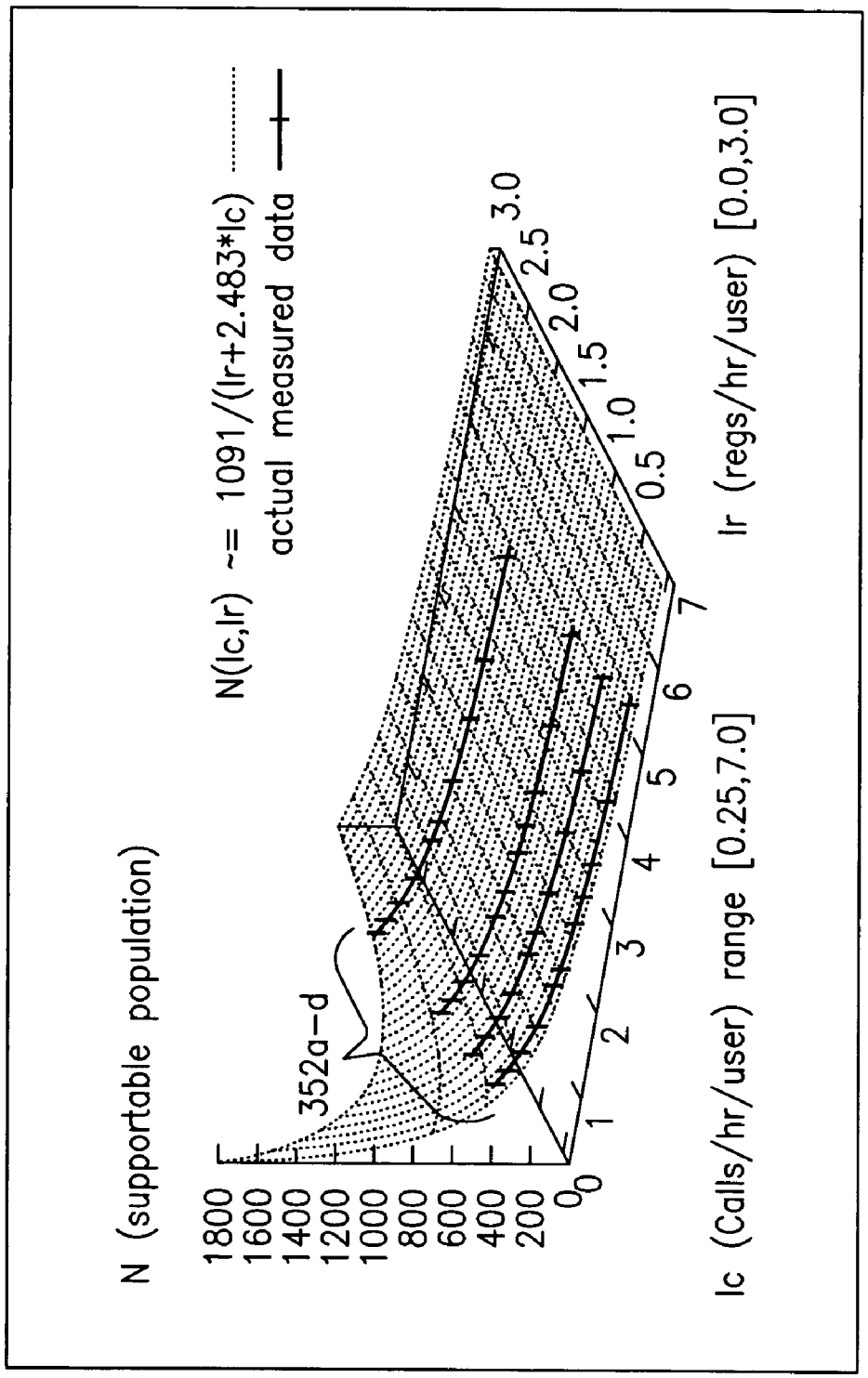
FIG. 35 is a three-dimensional graph of system performance.

Equation (3) describes the system scalability in terms of varying call-to-mobility ratios. FIG. 35 shows the 3-D plot of Equation (3), along with our measured data from FIG. 33 aligned on top, showing predicted curve surface vs. actual measurements, for $l_r$=0.1, 0.5, 1.0, and 2.0, and with N in the range [80K, 400K] for measured data. The four curves 352a–d based on our measured data align well with the 3-D contour plot. Any differences between our analytical model and the measured data are hard to make out visually.

We can evaluate the precision of our analytical model as follows. The absolute error introduced in predicting the maximum supportable population N given $l_c$ and $l_r$ using Equation (3) is determined by $|(1091/(l_r+2.483 \cdot l_c)) - \text{measured}\_N|$. It has a mean of 1.37 Kusers and a worse case limit of 5.4 Kusers. The error range does not change significantly over N. These results indicate that this approach represents a quite accurate approximation of the actual performance of EMCP.

Overall, our analytical results align well with our measured data. This suggest that they may be used to describe system performance with sufficient precision, if we ensure that our model's assumptions are not violated. These results may be used to avoid difficult and time consuming high load experiments, or to provide an approximation to guide more detailed experiments.

11 Implementation

While the invention has thus far been described primarily with reference to interworking Internet telephony systems with UMTS wireless telephony systems, one skilled in the art could readily apply the teachings of the invention to many different wireless telephony protocols, whether presently in existence or to be developed in the future, including, for example, GSM wireless telephony systems. The following discussion makes reference to an embodiment of the invention in which an Internet telephony system is interworked with a GSM wireless telephony system.

To prove the feasibility of our approach, we implemented a modified call setup scheme atop the EMCP component of the Bell Lab's RIMA, as described in: Thomas F. La Porta, Kazutaka Murakami, and Ramachandran Ramjee, "RIMA: router for integrated mobile access," in *Proceedings of the 11th IEEE International Symposium on Personal, Indoor and Mobile Radio Communication (PIMRC)*, London, United Kingdom, September 2000, which is hereby incorporated herein by reference in its entirety.

Figure 36:
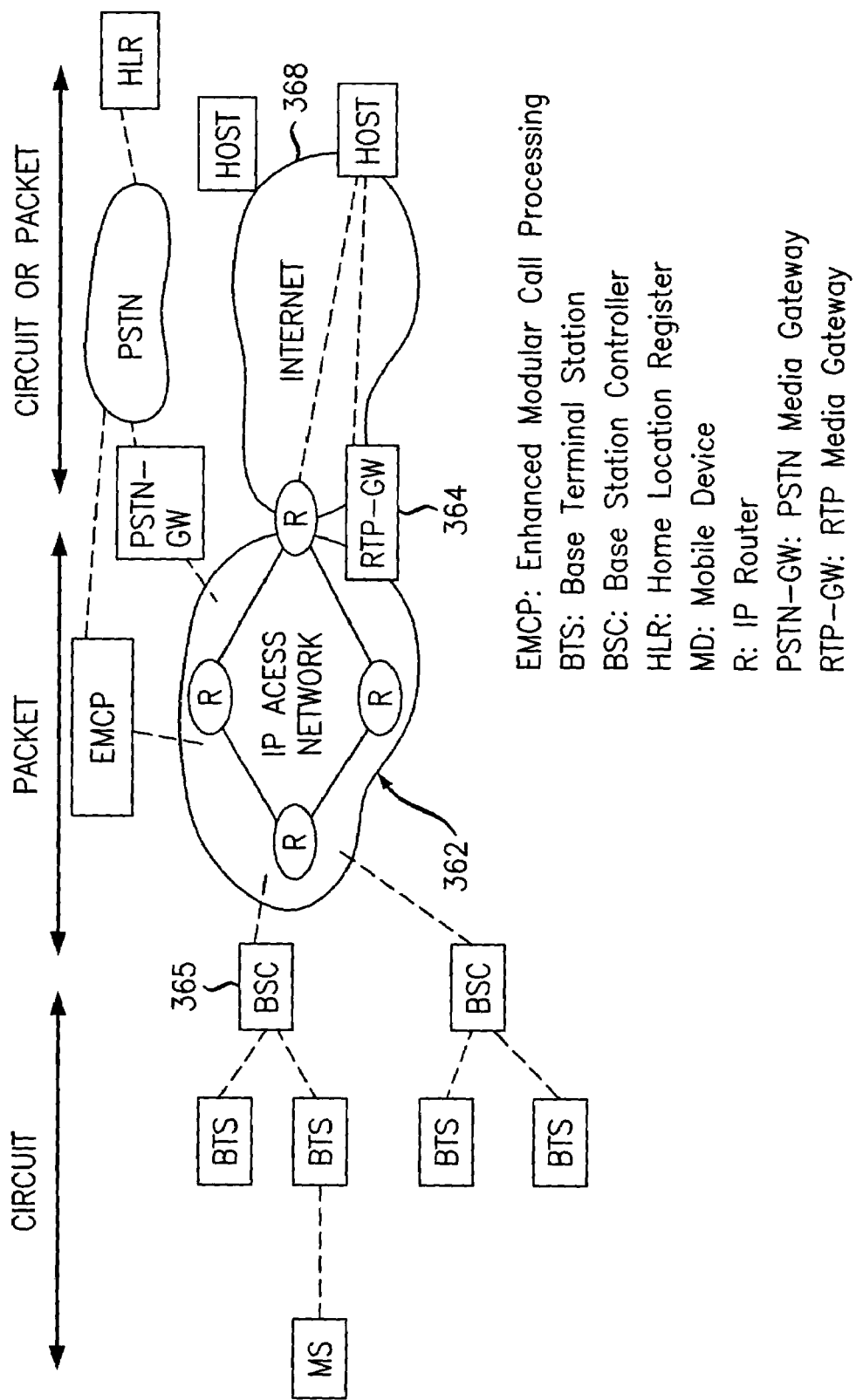
FIG. 36 shows a RIMA-based network.

FIG. 36 illustrates the overall architecture of one embodiment of this system. The modified call setup scheme was selected partly because it appears to be more applicable than modified registration scheme in the future mobile networks where a higher mobility rate is expected. It also requires substantially less modification to GSM equipment than a modified HLR scheme.

As discussed in section 7, RIMA is inherently IP based and uses packet networks for both transport and signaling. It is built on top of an IP router based network 362 and is composed of a cluster of commodity processors and various gateways performing media conversion and transcoding. It supports standard circuit voice for wireless terminals like GSM phones and connects to existing circuit networks like the PSTN. It was designed with the idea in mind of connecting to packet voice networks like the Internet.

RIMA provides wireless access to mobile users through a packet based wireless access network. A RIMA network has four major components: a BSC, a PSTN-GW, an RTP media gateway (RTP-GW), and the EMCP call processing engine, connected via an IP network.

Each BSC 365 has an IP interface and translates voice and signaling information between circuit and packet format. It serves as a media gateway translating between circuit voice and RTP/IP packet voice. With respect to signaling, it terminates the standard GSM interface towards mobile devices to accommodate existing radio networks and tunnels these signals in IP packets on the RIMA wireless access packet network.

A PSTN-GW performs media conversion between RTP/IP packet voice in the RIMA access network and circuit voice over the PSTN. It is controlled by the call processing engine, and it may perform possible transcodings between different coding schemes such as compressed wireless (e.g. GSM speech) and PCM (e.g. µ-law).

We added the RTP-GW 364 to provide RIMA with media connections to the Internet 368. Though the RIMA access network uses RTP internally, it was useful to centralize advanced functionality such as buffering, jitter adaptation, and handling of the Real-Time Control Protocol (RTCP) into a single location. In this way, other RIMA entities do not need to support the entire suite of complex RTP behavior. The RTP-GW 364 also performs transcoding between coding schemes as necessary, if for example a remote SIP endpoint does not indicate support for GSM encoding but wishes only to send and receive PCM. We implemented this gateway using the Bell Labs RTPlib library (as described in Henning Schulzrinne, Jonathan Lennox, Daniel Rubenstein, and Jonathan Rosenberg, "RTPlib: Bell Labs RTP library," available from http://www.bell-labs.com/topic/swdist/, which is hereby incorporated herein by reference in its entirety), which we ported to the same single-board computers as the PSTN-GW.

Figure 37:
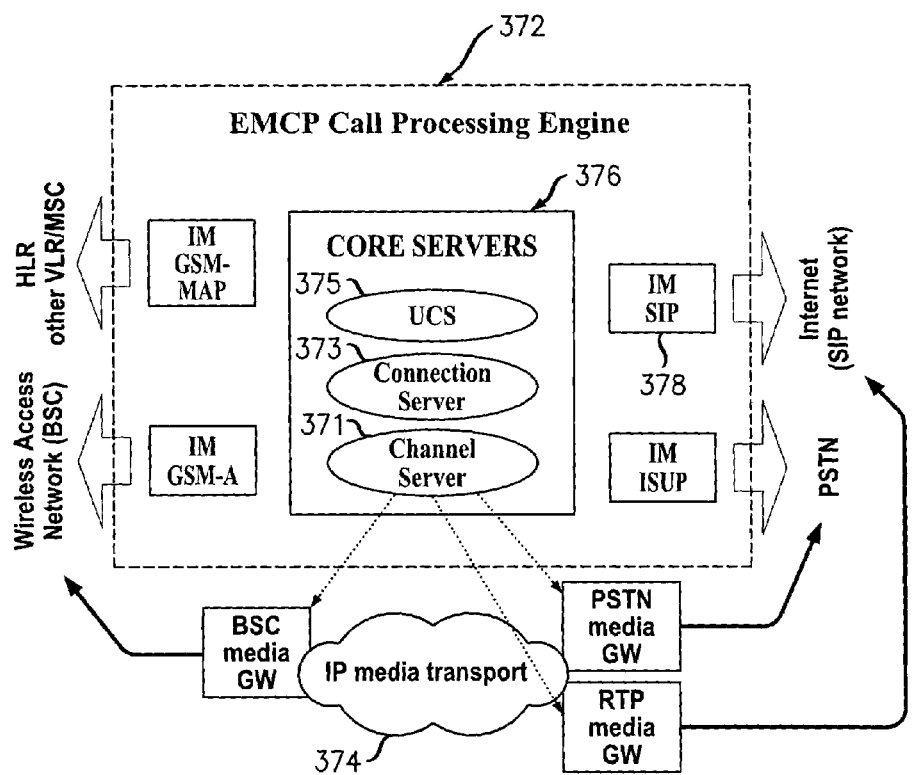
FIG. 37 shows a structure of a EMCP call processing engine.

RIMA's MSC and VLR functionality is realized by the EMCP call processing engine 372, whose structure is shown in FIG. 37. It is deployed on a cluster of commodity processors such as work-stations or single board computers. The engine is separated from the IP media transport network 374 and can be viewed as a signaling gateway by IP telephony networks. It consists of a collection of functionally distributed servers 372. Call processing and mobility management tasks are accomplished by their collaboration.

The call processing engine 372 is comprised of two server classes: core servers 376 and interworking managers (IMs) 378. Core servers 372 perform call processing and mobility management tasks common to any wireless system. Interworking managers 378 act as protocol gateways to internal core servers 376, isolating them from external signaling protocols thereby allowing the core servers 376 to evolve independently of these protocols.

There are three core servers: a channel server 371, a connection server 373, and a user call server (UCS) 375. The channel server 371 manages switching device resources, such as transport channels and DSPs for vocoding, allocated during call setup and deallocated during call release. The connection server 373 coordinates the allocation of channel resources to establish an end-to-end connection. The UCS 375 maintains information on the registration status of mobile devices currently located within the service area of the RIMA system and records call activities involving a particular mobile device. The UCS 375 also handles other mobility management tasks such as paging, handover, mobile user authentication, and ciphering.

Interworking managers allow core servers 376 to accommodate different sets of standard interfaces. As originally developed, EMCP has interworking managers supporting the GSM A standard protocol between an MSC and a BSC (IM-GSM-A), GSM MAP to the HLRs (IM-GSM-MAP), and ISUP to the PSTN (IM-ISUP). To realize the architecture described herein, we added a new interworking manager, IM-SIP, which supports SIP towards the Internet. Implementing this IM was straightforward. Due to the modularity of the EMCP architecture, IM-SIP could use the same interfaces as IM-ISUP. Because we chose the modified call setup model, we did not have to alter EMCP's registration procedures.

For the Home SIP Proxy, we extended an experimental SIP proxy server and registrar to allow it to communicate with an HLR. This proxy server was programmed to recognize that certain blocks of addresses corresponded to GSMusers. For these numbers it invokes a special procedure in which it asks the HLR for an MSRN. Because Enum has not yet been standardized, we instead used a table lookup to find SIP addresses corresponding to the MSRN returned.

12 Some Conclusions

We have presented the design, implementation, and evaluation of a distributed Mobile Switching Center. Our EMCP system embraces packet access networks, connects to IP telephony, separates transport and signaling, and supports multiple interfaces. The call processing engine has a modular design that promotes functional extensibility and implements new mechanisms to provide features. It is realized on top of a set of distributed commodity processors, thus leveraging price performance improvements of commodity equipment.

Our high load experiments indicate that EMCP can support a wide range of different traffic mixes, especially call-to-mobility ratios, while still satisfying given delay requirements. Our analytical model based on sharing of processing resources and using actual system measurements is able to predict system performance with sufficient detail. It provides a good approximation of the actual system performance.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A telecommunication system, comprising:
a circuit-based wireless telephony network providing wireless access to the system wherein said wireless telephony network comprises a first protocol engine and a first database;
a packet-based Internet telephony network in communication with said wireless telephony network, for providing Internet telephony access to the system wherein said Internet telephony network comprises a second protocol engine and a second database; and
a gateway controller in communication with said wireless telephony network and said Internet telephony network;
wherein said Internet telephony network is adapted for receiving a 1st signal for initiating communication between said wireless telephony network and said Internet telephony network, and for detecting a circuit-based wireless network communication at the time of initialization, and for sending a 2nd signal for obtaining the location of said gateway controller;
wherein said wireless telephony network is adapted for receiving said 2nd signal and for sending a 3rd signal for providing the location of said gateway controller;
wherein said Internet telephony network is further adapted for receiving said 3rd signal and for providing a 4th signal for finding and connecting to said gateway controller; and
wherein said gateway controller is adapted for receiving said 4th signal and for providing a 5th signal for connection with said wireless telephony network.

2. A method for providing telecommunication in a system between a circuit-based wireless telephony network for providing wireless access to the system, wherein the wireless telephony network comprises a first protocol engine and a first database, a packet-based Internet telephony network in communication with the wireless telephony network for providing Internet telephony access to the system wherein the Internet telephony network comprises a second protocol engine and a second database, and a gateway controller in communication with the wireless telephony network and the Internet telephony network, comprising:
receiving a 1st signal at the Internet telephony network for initiating communication between the wireless telephony network and said Internet telephony network;
detecting a circuit-based wireless network communication during said initiation step by the Internet telephony network;
sending a 2nd signal for obtaining the location of the gateway controller by the Internet telephony network;
receiving the 2nd signal at the wireless telephony network;
sending a 3rd signal for providing the location of the gateway controller by the wireless telephony network;
receiving said 3rd signal at the Internet telephony network;
sending a 4th signal by the Internet telephony network for finding and connecting to said gateway controller;
receiving said 4th signal at the gateway controller; and
sending a 5th signal by the gateway controller for connection with the wireless telephony network.

3. A telecommunication system comprising:
a circuit-based wireless telephony network providing wireless access to the system wherein said wireless telephony network comprises a first protocol engine and a first database, wherein said circuit-based wireless telephony network comprises a Mobile Telecommunications System;
a packet-based Internet telephony network in communication with said wireless telephony network for providing Internet telephony access to the system wherein said Internet telephony network comprises a second protocol engine and a second database; and
a gateway controller for providing an interface between at least said wireless telephony network and said Internet telephony network, wherein said interface comprises a signal gateway and voice data communications, wherein said gateway controller is controlled by a call processing engine and is configured to perform vocoding functions for translating between different data coding schemes;
wherein said Internet telephony network is adapted for receiving a 1st signal for initiating communication between said wireless telephony network and said Internet telephony network, and for detecting a circuit-based wireless network communication at the time of initialization, and for sending a 2nd signal for obtaining the location of said gateway controllers;
wherein said wireless telephony network is adapted for receiving said 2nd signal and for sending a 3rd signal for providing the location of said gateway controller;
wherein said Internet telephony network is further adapted for receiving said 3rd signal and for providing a 4th signal for finding and connecting to said gateway controller; and
wherein said gateway controller is adapted for receiving said 4th signal and for providing a 5th signal for connection with the wireless telephony network.

4. The system of 3, wherein said Mobile Telecommunications System comprises a Global System for Mobile Communications network.

5. The system of 3, wherein said Mobile Telecommunications System comprises a Universal Mobile Telecommunications System network.

6. The system of 3, wherein said interface further includes a packet-based mobile switching center.

7. The system of 3, wherein said interface further includes one or more circuit-based base station controllers.

8. The system of 3, wherein said signal gateway is selected from the group comprising a data signal transport gateway or a data signal transport gateway or a media gateway.

9. The system of 3, wherein the telecommunication system does not require utilization of a Public Switched Telephone Network.

10. The system of 3, wherein said Internet telephony network comprises an Internet Protocol network, a Session Initiation Protocol network or a H.323 protocol network.

11. A method for telecommunications between
   a) a circuit-based wireless telephony network providing wireless access comprising a Mobile Telecommunications System, wherein the wireless telephony network comprises a first protocol engine and a first database,
   b) a packet-based Internet telephony network in communication with the wireless telephony network for providing Internet telephony access, wherein the Internet telephony network comprises a second protocol engine and a second database; and
   c) a gateway controller for providing an interface between at least said wireless telephony network and said Internet telephony network, wherein said interface comprises a signal gateway and voice data communications, wherein said gateway controller is controlled by a call processing engine and is configured to perform vocoding functions for translating between different data coding schemes, comprising:
   receiving a $1^{st}$ signal at the Internet telephony network for initiating communication between the wireless telephony network and said Internet telephony network;
   detecting a circuit-based wireless network communication during said initiation step by the Internet telephony network;
   sending a $2^{nd}$ signal for obtaining the location of the gateway controller by the Internet telephony network;
   receiving the $2^{nd}$ signal at the wireless telephony network;
   sending a $3^{rd}$ signal for providing the location of the gateway controller by the wireless telephony network;
   receiving said $3^{rd}$ signal at the Internet telephony network;
   sending a $4^{th}$ signal by the Internet telephony network for finding and connecting to said gateway controller;
   receiving said $4^{th}$ signal at the gateway controller; and
   sending a $5^{th}$ signal by the gateway controller for connection with the wireless telephony network.

12. The method of 11, wherein said Mobile Telecommunications System comprises a Global System for Mobile Communications network.

13. The method of 11, wherein said Mobile Telecommunications System comprises a Universal Mobile Telecommunications System network.

14. The method of 11, wherein said interface further includes a packet-based mobile switching center.

15. The method of 11, wherein said interface further includes one or more circuit-based base station controllers.

16. The method of 11, wherein said signal gateway is selected from the group comprising a data signal transport gateway or a data signal transport gateway or a media gateway.

17. The method of 11, wherein the telecommunication system does not require utilization of a Public Switched Telephone Network.

18. The method of 11, wherein said Internet telephony network comprises an Internet Protocol network, a Session Initiation Protocol network or a H.323 protocol network.

19. A telecommunication system providing wireless telephony communication from an Internet telephony network, comprising:
   a circuit-based wireless telephony network providing wireless access to the system
   wherein said wireless telephony network comprises a first protocol engine and a first database;
   a packet-based Internet telephony network in communication with said wireless telephony network, for providing Internet telephony access to the system wherein said Internet telephony network comprises a module, a second protocol engine and a second database; and
   a gateway controller in communication with said wireless telephony network and said Internet telephony network;
   wherein said module is adapted for receiving a 1st signal for initiating communication between said wireless telephony network and said Internet telephony network, and for detecting a circuit-based wireless network communication at the time of initialization, and for sending a 2nd signal for obtaining the location of said gateway controller;
   wherein said wireless telephony network is adapted for receiving said 2nd signal and for sending a 3rd signal for providing the location of said gateway controller;
   wherein said module is further adapted for receiving said 3rd signal and for providing a 4th signal for finding and connecting to said gateway controller; and
   wherein said gateway controller is adapted for receiving said 4th signal and for providing a 5th signal for connection with said wireless telephony network.

20. A method for providing wireless telephony communication from an Internet telephony network, comprising:
   providing wireless access to a circuit-based wireless telephony network wherein said wireless telephony network comprises a first protocol engine and a first database;
   providing Internet telephony access to a packet-based Internet telephony network in communication with said wireless telephony network, wherein said Internet telephony network comprises a module, a second protocol engine and a second database; and
   providing communication between said wireless telephony network and said Internet telephony network by a gateway controller, further comprising;
   receiving a 1st signal for initiating communication between the wireless telephony network and said Internet telephony network at the module;
   detecting a circuit-based wireless network communication during said initiation step by the module;
   sending a 2nd signal for obtaining the location of the gateway controller by the module;
   receiving the 2nd signal at the wireless telephony network;
   sending a 3rd signal for providing the location of the gateway controller by the wireless telephony network;
   receiving said 3rd signal at the module;
   sending a 4th signal by the module for finding and connecting to said gateway controller;
   receiving said 4th signal at the gateway controller; and
   sending a 5th signal by the gateway controller for connection with the wireless telephony network.

* * * * *